(12) United States Patent
Lambert

(10) Patent No.: US 10,979,412 B2
(45) Date of Patent: Apr. 13, 2021

(54) METHODS AND APPARATUS FOR SECURE DEVICE AUTHENTICATION

(71) Applicant: NXP USA, Inc., Austin, TX (US)

(72) Inventor: Paul A. Lambert, Mountain View, CA (US)

(73) Assignee: NXP USA, Inc., Austin, TX (US)

( * ) Notice: Subject to any disclaimer, the term of this patent is extended or adjusted under 35 U.S.C. 154(b) by 417 days.

(21) Appl. No.: 16/079,984

(22) PCT Filed: Feb. 22, 2017

(86) PCT No.: PCT/IB2017/000230
§ 371 (c)(1),
(2) Date: Aug. 24, 2018

(87) PCT Pub. No.: WO2017/168228
PCT Pub. Date: Oct. 5, 2017

(65) Prior Publication Data
US 2019/0089532 A1    Mar. 21, 2019

Related U.S. Application Data

(60) Provisional application No. 62/305,030, filed on Mar. 8, 2016.

(51) Int. Cl.
*H04L 29/06*   (2006.01)
*H04L 9/32*    (2006.01)
(Continued)

(52) U.S. Cl.
CPC ............ *H04L 63/08* (2013.01); *H04L 9/0844* (2013.01); *H04L 9/32* (2013.01); *H04L 9/3236* (2013.01);
(Continued)

(58) Field of Classification Search
CPC ......... H04L 63/08; H04L 9/3273; H04L 9/32; H04L 9/3242; H04L 9/0844;
(Continued)

(56) References Cited

U.S. PATENT DOCUMENTS 5,155,833 A    10/1992   Cullison et al.
5,390,165 A    2/1995    Tuch
(Continued)

FOREIGN PATENT DOCUMENTS

CN    88102647    12/1988
CN    1140272     1/1997
(Continued)

OTHER PUBLICATIONS

"Advisory Action", U.S. Appl. No. 13/804,425, dated Dec. 26, 2014, 3 pages.
(Continued)

*Primary Examiner* — Huan V Doan

(57) ABSTRACT

The present disclosure describes apparatuses and techniques for secure device authentication. In some aspects, a public ephemeral key of a device is exposed. A message received from a remote device to authenticate includes a hash of the public ephemeral key of the device, a public ephemeral key and an encrypted public key of the remote device, and an encrypted hash value useful to prove ownership of the public key received from the remote device. An encryption key is generated based on the public ephemeral key of the remote device and a private ephemeral key of the device. The device then decrypts, with the encryption key, the encrypted public key of the remote device and the encrypted hash value. The remote device is then authenticated by verifying, based on the decrypted hash value, that the remote device owns the decrypted public key.

20 Claims, 11 Drawing Sheets

(51) Int. Cl.
*H04L 9/08* (2006.01)
*H04W 8/24* (2009.01)
*H04W 12/06* (2021.01)
*H04W 12/04* (2021.01)

(52) U.S. Cl.
CPC .......... *H04L 9/3242* (2013.01); *H04L 9/3273* (2013.01); *H04L 63/0853* (2013.01); *H04L 63/0876* (2013.01); *H04W 8/24* (2013.01); *H04W 12/06* (2013.01); *H04L 9/0841* (2013.01); *H04L 2209/80* (2013.01); *H04L 2209/805* (2013.01); *H04L 2463/062* (2013.01); *H04W 12/04071* (2019.01)

(58) Field of Classification Search
CPC ............... H04L 9/3236; H04L 63/0853; H04L 63/0876; H04L 2463/062; H04W 8/24; H04W 12/06
See application file for complete search history.

(56) References Cited

U.S. PATENT DOCUMENTS

| | | |
|---|---|---|
| 5,467,398 A | 11/1995 | Pierce et al. |
| 5,469,506 A | 11/1995 | Berson et al. |
| 5,479,514 A | 12/1995 | Klonowski |
| 5,481,733 A | 1/1996 | Douglis et al. |
| 5,617,118 A | 4/1997 | Thompson |
| 5,673,416 A | 9/1997 | Chee et al. |
| 5,696,989 A | 12/1997 | Miura et al. |
| 5,771,356 A | 6/1998 | Leger et al. |
| 5,828,835 A | 10/1998 | Isfeld et al. |
| 5,884,099 A | 3/1999 | Klingelhofer |
| 5,991,519 A | 11/1999 | Benhammou et al. |
| 6,006,018 A | 12/1999 | Burnett et al. |
| 6,014,722 A | 1/2000 | Rudin et al. |
| 6,058,188 A | 5/2000 | Chandersekaran et al. |
| 6,092,108 A | 7/2000 | DiPlacido et al. |
| 6,145,069 A | 11/2000 | Dye |
| 6,167,514 A | 12/2000 | Matsui et al. |
| 6,216,230 B1 | 4/2001 | Rallis et al. |
| 6,230,277 B1 | 5/2001 | Nakaoka et al. |
| 6,330,626 B1 | 12/2001 | Dennin et al. |
| 6,389,538 B1 | 5/2002 | Gruse et al. |
| 6,463,509 B1 | 10/2002 | Teoman et al. |
| 6,473,861 B1 | 10/2002 | Stokes |
| 6,564,318 B1 | 5/2003 | Gharda et al. |
| 6,601,167 B1 | 7/2003 | Gibson et al. |
| 6,614,985 B1 | 9/2003 | Tokunaka et al. |
| 6,678,790 B1 | 1/2004 | Kumar |
| 6,704,872 B1 | 3/2004 | Okada |
| 6,711,447 B1 | 3/2004 | Saeed |
| 6,756,988 B1 | 6/2004 | Wang et al. |
| 6,799,271 B2 | 9/2004 | Kugai |
| 6,823,472 B1 | 11/2004 | DeKoning et al. |
| 6,832,280 B2 | 12/2004 | Malik et al. |
| 6,901,298 B1 | 5/2005 | Govindaraj et al. |
| 7,010,808 B1 | 3/2006 | Leung et al. |
| 7,035,827 B2 | 4/2006 | Ezaki |
| 7,036,018 B2 | 4/2006 | Horvat et al. |
| 7,069,439 B1 | 6/2006 | Chen et al. |
| 7,089,419 B2 | 8/2006 | Foster et al. |
| 7,103,788 B1 | 9/2006 | Souza et al. |
| 7,117,352 B1 | 10/2006 | Giles et al. |
| 7,126,913 B1 | 10/2006 | Patel et al. |
| 7,194,638 B1 | 3/2007 | Larky |
| 7,206,940 B2 | 4/2007 | Evans et al. |
| 7,210,038 B2 | 4/2007 | Walmsley |
| 7,266,842 B2 | 9/2007 | Foster et al. |
| 7,299,365 B2 | 11/2007 | Evans |
| 7,308,591 B2 | 12/2007 | Dubinsky |
| 7,333,464 B2 | 2/2008 | Yang et al. |
| 7,356,707 B2 | 4/2008 | Foster et al. |
| 7,370,349 B2 | 5/2008 | Holvey et al. |
| 7,373,506 B2 | 5/2008 | Asano et al. |
| 7,376,976 B2 | 5/2008 | Fierstein et al. |
| 7,496,952 B2 | 2/2009 | Edwards et al. |
| 7,499,548 B2 | 3/2009 | Meandzija et al. |
| 7,511,636 B2 | 3/2009 | Takahashi |
| 7,516,325 B2 | 4/2009 | Willey |
| 7,522,726 B2 | 4/2009 | Ishiguro et al. |
| 7,536,558 B2 | 5/2009 | Neble et al. |
| 7,549,056 B2 | 6/2009 | Carr |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,620,784 B2 | 11/2009 | Panabaker |
| 7,676,040 B2 | 3/2010 | Augenstein et al. |
| 7,725,738 B1 | 5/2010 | Langhammer et al. |
| 7,743,260 B2 | 6/2010 | Fetik |
| 7,774,635 B2 | 8/2010 | Shiota |
| 7,788,670 B2 | 8/2010 | Bodas et al. |
| 7,818,389 B1 | 10/2010 | Chiang et al. |
| 7,835,725 B2 | 11/2010 | Suzuki et al. |
| 7,865,733 B2 | 1/2011 | Goto et al. |
| 7,873,841 B2 | 1/2011 | Mullis, II et al. |
| 7,898,857 B2 | 3/2011 | Kirsch et al. |
| 7,900,060 B2 | 3/2011 | Hodzic |
| 7,916,594 B2 | 3/2011 | Yang |
| 7,991,943 B2 | 8/2011 | Berenbaum et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,094,822 B2 | 1/2012 | Suzuki |
| 8,095,816 B1 | 1/2012 | Chan |
| 8,117,478 B2 | 2/2012 | Liu et al. |
| 8,139,521 B2 | 3/2012 | Mukherjee et al. |
| 8,166,309 B2 | 4/2012 | Muralidharan et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 8,418,242 B2 | 4/2013 | Zhang et al. |
| 8,423,789 B1 | 4/2013 | Poo et al. |
| 8,443,187 B1 | 5/2013 | Orr |
| 8,443,211 B2 | 5/2013 | Zhao et al. |
| 8,483,718 B2 | 7/2013 | Hwang |
| 8,510,560 B1 | 8/2013 | Lambert et al. |
| 8,645,716 B1 | 2/2014 | Dujari et al. |
| 8,688,968 B2 | 4/2014 | Chu et al. |
| 8,694,782 B2 | 4/2014 | Lambert |
| 8,839,016 B2 | 9/2014 | Zhang et al. |
| 8,843,686 B1 | 9/2014 | Chan et al. |
| 9,009,778 B2 | 4/2015 | Pearce et al. |
| 9,141,394 B2 | 9/2015 | Sakarda |
| 9,220,012 B1 | 11/2015 | Inamdar |
| 9,253,175 B1 | 2/2016 | Orr |
| 9,363,249 B2 | 6/2016 | Lambert et al. |
| 9,398,455 B2 | 7/2016 | Lambert |
| 9,402,270 B2 | 7/2016 | Lambert |
| 2002/0065834 A1 | 5/2002 | Wiggen et al. |
| 2002/0069354 A1 | 6/2002 | Fallon et al. |
| 2002/0087816 A1 | 7/2002 | Atkinson et al. |
| 2002/0103930 A1 | 8/2002 | Kamentsky et al. |
| 2003/0014368 A1 | 1/2003 | Leurig et al. |
| 2003/0188162 A1 | 10/2003 | Candelore et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0015621 A1 | 1/2004 | Tanaka |
| 2004/0030909 A1 | 2/2004 | Sako et al. |
| 2004/0054898 A1 | 3/2004 | Chao et al. |
| 2004/0103272 A1 | 5/2004 | Zimmer et al. |
| 2004/0125679 A1 | 7/2004 | Kwean |
| 2004/0158669 A1 | 8/2004 | Weng et al. |
| 2004/0158708 A1 | 8/2004 | Peyravian et al. |
| 2004/0184343 A1 | 9/2004 | Roohparvar et al. |
| 2004/0187001 A1 | 9/2004 | Bousis |
| 2004/0193875 A1 | 9/2004 | Aura |
| 2004/0257462 A1 | 12/2004 | Goris et al. |
| 2004/0264699 A1 | 12/2004 | Meandzija et al. |
| 2004/0266386 A1 | 12/2004 | Kuo |
| 2005/0015602 A1 | 1/2005 | Rees |

(56) References Cited

U.S. PATENT DOCUMENTS

| | | |
|---|---|---|
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0114686 A1 | 5/2005 | Ball et al. |
| 2005/0138365 A1 | 6/2005 | Bellipady et al. |
| 2005/0144468 A1 | 6/2005 | Northcutt et al. |
| 2005/0156925 A1 | 7/2005 | Fong et al. |
| 2005/0177674 A1 | 8/2005 | Ober et al. |
| 2005/0185596 A1 | 8/2005 | Kamentsky et al. |
| 2005/0210290 A1 | 9/2005 | Ono et al. |
| 2005/0278523 A1 | 12/2005 | Fortin et al. |
| 2006/0004946 A1 | 1/2006 | Shah et al. |
| 2006/0036897 A1 | 2/2006 | Lin et al. |
| 2006/0059372 A1 | 3/2006 | Fayar et al. |
| 2006/0072748 A1 | 4/2006 | Buer |
| 2006/0075259 A1 | 4/2006 | Bajikar et al. |
| 2006/0090084 A1 | 4/2006 | Buer |
| 2006/0104243 A1 | 5/2006 | Park |
| 2006/0117177 A1 | 6/2006 | Buer |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0150241 A1* | 7/2006 | Huh ............... H04L 63/0823 726/4 |
| 2006/0156390 A1 | 7/2006 | Baugher |
| 2006/0200670 A1 | 9/2006 | Kuffel et al. |
| 2006/0209595 A1 | 9/2006 | Newell |
| 2006/0233149 A1 | 10/2006 | Rustagi et al. |
| 2006/0253704 A1 | 11/2006 | Kempf et al. |
| 2006/0253716 A1 | 11/2006 | Dhiman et al. |
| 2006/0259656 A1 | 11/2006 | Sullivan |
| 2006/0285686 A1 | 12/2006 | Van Den Heuvel et al. |
| 2007/0005824 A1 | 1/2007 | Howard |
| 2007/0011445 A1 | 1/2007 | Waltermann et al. |
| 2007/0022469 A1 | 1/2007 | Cooper et al. |
| 2007/0038866 A1 | 2/2007 | Bardsley et al. |
| 2007/0073915 A1 | 3/2007 | Go et al. |
| 2007/0097904 A1 | 5/2007 | Mukherjee et al. |
| 2007/0098178 A1 | 5/2007 | Raikar |
| 2007/0136792 A1 | 6/2007 | Ting et al. |
| 2007/0150756 A1 | 6/2007 | Kudelski |
| 2007/0174602 A1 | 7/2007 | Kao |
| 2007/0180271 A1 | 8/2007 | Hatakeyama et al. |
| 2007/0186105 A1 | 8/2007 | Bailey et al. |
| 2007/0189249 A1 | 8/2007 | Gurevich et al. |
| 2007/0220501 A1 | 9/2007 | Yanagawa et al. |
| 2007/0234028 A1 | 10/2007 | Rothman et al. |
| 2007/0242643 A1 | 10/2007 | Chandra et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0005549 A1 | 1/2008 | Ke |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0043508 A1 | 2/2008 | Chao et al. |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0082837 A1 | 4/2008 | Mattson |
| 2008/0091944 A1 | 4/2008 | von Mueller et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0165952 A1 | 7/2008 | Smith et al. |
| 2008/0295157 A1 | 11/2008 | Wong et al. |
| 2008/0298289 A1 | 12/2008 | Jeyaseelan |
| 2008/0313462 A1 | 12/2008 | Zhao et al. |
| 2009/0006658 A1 | 1/2009 | Gough |
| 2009/0019250 A1 | 1/2009 | Rofougaran et al. |
| 2009/0024846 A1 | 1/2009 | Ganesan et al. |
| 2009/0049222 A1 | 2/2009 | Lee et al. |
| 2009/0059841 A1 | 3/2009 | Laroia et al. |
| 2009/0077618 A1 | 3/2009 | Pearce et al. |
| 2009/0080389 A1 | 3/2009 | Messerges et al. |
| 2009/0131061 A1 | 5/2009 | Palanki et al. |
| 2009/0199031 A1 | 8/2009 | Zhang |
| 2009/0217043 A1 | 8/2009 | Metke et al. |
| 2009/0254771 A1 | 10/2009 | So et al. |
| 2009/0323972 A1 | 12/2009 | Kohno et al. |
| 2009/0327608 A1 | 12/2009 | Eschmann et al. |
| 2010/0023747 A1 | 1/2010 | Asnaashari et al. |
| 2010/0039864 A1 | 2/2010 | Sarin et al. |
| 2010/0058045 A1 | 3/2010 | Borras et al. |
| 2010/0070751 A1 | 3/2010 | Chue |
| 2010/0174934 A1 | 7/2010 | Zhao |
| 2010/0217935 A1 | 8/2010 | Cho et al. |
| 2011/0039592 A1 | 2/2011 | Haddad et al. |
| 2011/0211564 A1 | 9/2011 | Yoneyama et al. |
| 2011/0231649 A1 | 9/2011 | Bollay et al. |
| 2011/0231652 A1 | 9/2011 | Bollay et al. |
| 2012/0284517 A1 | 11/2012 | Lambert |
| 2012/0287337 A1 | 11/2012 | Kumar et al. |
| 2013/0031346 A1 | 1/2013 | Sakarda |
| 2013/0046966 A1 | 2/2013 | Chu |
| 2013/0124844 A1 | 5/2013 | Baratam |
| 2013/0246792 A1 | 9/2013 | Lambert |
| 2013/0346777 A1 | 12/2013 | Zhang |
| 2014/0258724 A1 | 9/2014 | Lambert et al. |
| 2015/0071438 A1 | 3/2015 | Lambert |
| 2017/0026174 A1* | 1/2017 | Pang ...................... H04L 63/18 |

FOREIGN PATENT DOCUMENTS

| | | |
|---|---|---|
| CN | 101097522 | 1/2008 |
| CN | 103532713 A | 1/2014 |
| CN | 102272734 | 9/2014 |
| EP | 1847911 | 10/2007 |
| EP | 2493230 | 8/2012 |
| EP | 2605170 | 6/2013 |
| GB | 2407239 | 4/2005 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |
| WO | 2013019423 | 2/2013 |
| WO | 2013074797 | 5/2013 |
| WO | 2017168228 | 10/2017 |

OTHER PUBLICATIONS

"Amendment 3: Enhancements for Very High Throughput In the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft Standard for Information Technology Telecommunications and Information Exchange, 601 pages.

"Amendment 3: Enhancements for Very High Throughput in the 60 GHz Band", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Jul. 1, 2012, 628 pages.

"Amendment 4: Enhancements for Very High Throughput for Operation in Bands below 6 GHz", IEEE Standard for Information technology; Telecommunications and information exchange between systems; Local and metropolitan area networks; Specific requirements; Part 11: Wireless LAN Medium Access Control (MAC) and Physical Layer (PHY) Specifications, 425 pages.

"Amendment 4: TV White Spaces Operation", The Institute of Electrical and Electronics Engineers, Inc., IEEE Std P802.11af/D1. 05 Draft Standard for Information Technology—Telecommunications and Information Exchange Between Systems—Local and Metropolitan area networks—Specific Requirements, Part 11: Wireless LAN Medium Access Control (MAC) and Physical Layer, 123 Pages.

(56) References Cited

OTHER PUBLICATIONS

"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, 394 Pages.
"Amendment 8: IEEE 802.11 Wireless Network Management", Prepared by the LAN/MAN Standards Committee of the IEEE Computer Society, Draft Standard for Information technology Telecommunications and information exchange between systems—Local and metropolitan area networks Specific requirements—Part 11: Wireless LAN Medium Access Control (MAC) and Physical Layer (PHY) specifications, 426 Pages.
"Board Opinion", CN Application No. 200980136849.9, Aug. 28, 2015, 18 Pages.
"Corrected Notice of Allowance", U.S. Appl. No. 13/676,701, dated May 18, 2016, 2 pages.
"Examiner's Answer to Appeal Brief", U.S. Appl. No. 13/958,101, filed Apr. 8, 2016, 9 pages.
"Extensions to Direct Link Setup (DLS) Comments", IEEE, P802.11z, pp. 1-3.
"Final Office Action", U.S. Appl. No. 13/552,421, dated Mar. 16, 2015, 10 pages.
"Final Office Action", U.S. Appl. No. 12/098,254, dated May 18, 2011, 11 pages.
"Final Office Action", U.S. Appl. No. 12/125,670, dated May 24, 2011, 11 pages.
"Final Office Action", U.S. Appl. No. 12/541,731, dated May 31, 2012, 11 pages.
"Final Office Action", U.S. Appl. No. 12/178,268, dated May 25, 2011, 13 pages.
"Final Office Action", U.S. Appl. No. 13/804,425, dated Nov. 21, 2014, 17 pages.
"Final Office Action", U.S. Appl. No. 13/958,101, dated Dec. 19, 2014, 17 pages.
"Final Office Action", U.S. Appl. No. 13/863,079, dated May 7, 2014, 7 pages.
"Final Office Action", U.S. Appl. No. 13/863,079, dated Jan. 15, 2015, 7 pages.
"Final Office Action", U.S. Appl. No. 12/101,668, dated May 10, 2012, 8 pages.
"Final Office Action", U.S. Appl. No. 12/125,693, dated Jun. 9, 2011, 9 pages.
"Final Office Action", U.S. Appl. No. 13/804,425, dated Nov. 6, 2015, 9 pages.
"Foreign Office Action", CN Application No. 200980136849.9, dated May 24, 2013, 20 Pages.
"Foreign Decision to Grant", JP Application No. 2011-544456, dated May 20, 2014, 2 pages.
"Foreign Notice of Allowance", JP Application No. 2011-527899, dated Jan. 28, 2014, 1 Page.
"Foreign Notice of Allowance", CN Application No. 200980153758.6, dated Jul. 15, 2014, 4 Pages.
"Foreign Office Action", CN Application No. 200980136849.9, dated May 19, 2014, 11 Pages.
"Foreign Office Action", KR Application No. 10-2011-7008700, dated Jun. 16, 2015, 13 Pages.
"Foreign Office Action", CN Application No. 200980153758.6, dated Apr. 27, 2013, 14 pages.
"Foreign Office Action", CN Application No. 200980136849.9, dated Feb. 7, 2014, 15 Pages.
"Foreign Office Action", JP Application No. 2011-527899, dated Aug. 13, 2013, 2 pages.
"Foreign Office Action", JP Application No. 2011-544456, dated Dec. 3, 2013, 2 pages.
"Foreign Office Action", CN Application No. 201280033662.8, dated May 3, 2016, 26 pages.
"Foreign Office Action", European Patent Application No. 09803951.4, dated May 24, 2012, 3 pages.
"Foreign Office Action", JP Application No. 2011-527899, dated Nov. 6, 2012, 4 pages.
"Foreign Office Action", JP Application No. 2011-527899, dated Apr. 16, 2013, 5 pages.
"Foreign Office Action", European Patent Application No. 09803951.4, dated Dec. 13, 2012, 6 pages.
"Foreign Office Action", JP Application No. 2011-544456, dated Jul. 9, 2013, 6 pages.
"Foreign Office Action", JP Application No. 2011-544456, dated Jan. 29, 2013, 7 pages.
"Foreign Office Action", CN Application No. 200980153758.6, dated Dec. 30, 2013, 8 pages.
"IEEE Standard for Information Technology—Telecommunications and Information Exchange between Systems—Local and Metropolitan Area Networks—Specific Requirements", IEEE Std. 802.11-2007, Jun. 12, 2007, 1232 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"Information Technology—Telecommunications and Information Exchange Between Systems—Local and Metropolitan Area Networks—Specfic Requirements", IEEE, Wireless LAN Medium Access Control (MAC) and Physical Layer (PHY) Specifications, Aug. 20, 1999, 531 pages.
"Intent to Grant", EP Application No. 09803951.4, dated May 14, 2013, 13 Pages.
"International Search Report", Application No. PCT/US2008/078343, dated May 18, 2009, 5 pages.
"International Search Report", Application No. PCT/US2008/078343, Partial International Search, dated Mar. 5, 2009, 2 pages.
"International Search Report and Written Opinion", PCT Application No. PCT/US2013/031545, dated Mar. 14, 2015, 11 pages.
"International Search Report and Written Opinion", Application No. PCT/US2009/067767, dated Mar. 26, 2010, 12 pages.
"International Search Report and Written Opinion", Application No. PCT/US2009/056973, dated Nov. 4, 2009, 13 pages.
"International Search Report and Written Opinion", PCT Application No. PCT/US2014/0211295, dated Nov. 24, 2014, 16 pages.
"International Search Report and Written Opinion", Application No. PCT/US2012/047426, dated Oct. 19, 2012, 7 pages.
"International Search Report and Written Opinion", PCT Application No. PCT/US2014/054885, dated Dec. 4, 2014, 8 pages.
"International Search Report and Written Opinion", PCT Application PCT/US2012/036236, dated Jul. 6, 2012, 9 pages.
"International Search Report and Written Opinion", Application No. PCT/US2012/065290, dated May 2, 2013, 9 pages.
"Invitation to Pay Additional Fees and Partial International Search Report", PCT Application No. PCT/US2014/021295, dated Aug. 13, 2014, 5 pages.
"Marketing Requirements Document for Interoperability Testing & Certification of Device Provisioning Protocol", Wi-Fi Alliance Device Provisioning Protocol Marketing Task Group; Version 1.2, Jan. 1, 2012, 34 pages.
"Non-Final Office Action", U.S. Appl. No. 12/178,268, dated Dec. 22, 2010, 10 pages.
"Non-Final Office Action", U.S. Appl. No. 12/559,987, dated Nov. 9, 2011, 10 pages.
"Non-Final Office Action", U.S. Appl. No. 13/462,972, dated May 22, 2013, 10 pages.
"Non-Final Office Action", U.S. Appl. No. 13/863,079, dated Jun. 20, 2013, 10 pages.
"Non-Final Office Action", U.S. Appl. No. 13/874,201, dated Jun. 5, 2015, 10 pages.
"Non-Final Office Action", U.S. Appl. No. 12/125,670, dated Dec. 13, 2011, 11 pages.
"Non-Final Office Action", U.S. Appl. No. 12/541,731, dated Sep. 4, 2012, 11 pages.
"Non-Final Office Action", U.S. Appl. No. 12/125,670, dated Jun. 4, 2012, 12 pages.

(56) References Cited

OTHER PUBLICATIONS

"Non-Final Office Action", U.S. Appl. No. 13/676,701, dated Jul. 31, 2015, 12 pages.
"Non-Final Office Action", U.S. Appl. No. 14/198,994, dated Jul. 31, 2015, 12 pages.
"Non-Final Office Action", U.S. Appl. No. 12/178,268, dated Dec. 21, 2011, 13 pages.
"Non-Final Office Action", U.S. Appl. No. 13/657,511, dated Mar. 28, 2013, 13 pages.
"Non-Final Office Action", U.S. Appl. No. 13/958,101, dated Jun. 6, 2014, 14 pages.
"Non-Final Office Action", U.S. Appl. No. 13/804,425, dated Jul. 18, 2014, 14 pages.
"Non-Final Office Action", U.S. Appl. No. 14/205,196, dated Feb. 5, 2016, 14 pages.
"Non-Final Office Action", U.S. Appl. No. 13/804,425, dated May 4, 2015, 15 pages.
"Non-Final Office Action", U.S. Appl. No. 13/252,416, dated Mar. 13, 2013, 16 pages.
"Non-Final Office Action", U.S. Appl. No. 13/958,101, dated Apr. 8, 2015, 16 pages.
"Non-Final Office Action", U.S. Appl. No. 13/552,421, dated Sep. 30, 2014, 23 pages.
"Non-Final Office Action", U.S. Appl. No. 13/333,551, dated Apr. 6, 2012, 5 pages.
"Non-Final Office Action", U.S. Appl. No. 13/683,056, dated Nov. 8, 2013, 5 pages.
"Non-Final Office Action", U.S. Appl. No. 14/482,072, dated Nov. 19, 2015, 5 pages.
"Non-Final Office Action", U.S. Appl. No. 12/271,761, dated Oct. 3, 2011, 6 pages.
"Non-Final Office Action", U.S. Appl. No. 12/636,558, dated Jan. 10, 2012, 6 pages.
"Non-Final Office Action", U.S. Appl. No. 13/598,282, dated Oct. 16, 2013, 6 pages.
"Non-Final Office Action", U.S. Appl. No. 13/863,079, dated Aug. 27, 2014, 6 pages.
"Non-Final Office Action", U.S. Appl. No. 12/125,693, dated Dec. 20, 2010, 7 pages.
"Non-Final Office Action", U.S. Appl. No. 12/101,668, dated Apr. 5, 2011, 7 pages.
"Non-Final Office Action", U.S. Appl. No. 12/125,693, dated Oct. 3, 2011, 7 pages.
"Non-Final Office Action", U.S. Appl. No. 13/863,079, dated Apr. 9, 2015, 7 pages.
"Non-Final Office Action", U.S. Appl. No. 12/098,254, dated Jan. 14, 2011, 8 pages.
"Non-Final Office Action", U.S. Appl. No. 12/636,558, dated May 29, 2012, 8 pages.
"Non-Final Office Action", U.S. Appl. No. 12/101,668, dated Aug. 9, 2012, 8 pages.
"Non-Final Office Action", U.S. Appl. No. 12/125,670, dated Dec. 7, 2010, 9 pages.
"Non-Final Office Action", U.S. Appl. No. 12/541,731, dated Oct. 21, 2011, 9 pages.
"Non-Final Office Action", U.S. Appl. No. 13/863,079, dated Oct. 1, 2013, 9 pages.
"Notice of Allowance", U.S. Appl. No. 13/252,416, dated Sep. 27, 2013, 10 pages.
"Notice of Allowance", U.S. Appl. No. 14/198,994, dated Jan. 29, 2016, 10 pages.
"Notice of Allowance", U.S. Appl. No. 12/098,254, dated Sep. 28, 2011, 4 pages.
"Notice of Allowance", U.S. Appl. No. 12/098,254, dated Dec. 14, 2011, 4 pages.
"Notice of Allowance", U.S. Appl. No. 13/333,551, dated May 30, 2012, 4 pages.
"Notice of Allowance", U.S. Appl. No. 12/178,268, dated Jul. 2, 2012, 4 pages.
"Notice of Allowance", U.S. Appl. No. 12/636,558, dated Jan. 9, 2013, 4 pages.
"Notice of Allowance", U.S. Appl. No. 13/598,282, dated May 6, 2014, 4 pages.
"Notice of Allowance", U.S. Appl. No. 13/683,056, dated May 9, 2014, 4 pages.
"Notice of Allowance", U.S. Appl. No. 13/552,421, dated May 12, 2015, 4 pages.
"Notice of Allowance", U.S. Appl. No. 12/559,987, dated Jun. 15, 2012, 5 pages.
"Notice of Allowance", U.S. Appl. No. 13/552,421, dated Jun. 10, 2015, 5 pages.
"Notice of Allowance", U.S. Appl. No. 13/676,701, dated Feb. 10, 2016, 5 pages.
"Notice of Allowance", U.S. Appl. No. 14/482,072, dated Mar. 22, 2016, 5 pages.
"Notice of Allowance", U.S. Appl. No. 12/271,761, dated Jan. 3, 2012, 6 pages.
"Notice of Allowance", U.S. Appl. No. 12/101,668, dated Jan. 11, 2013, 6 pages.
"Notice of Allowance", U.S. Appl. No. 13/874,201, dated Sep. 25, 2015, 6 pages.
"Notice of Allowance", U.S. Appl. No. 12/125,670, dated Dec. 12, 2012, 8 pages.
"Notice of Allowance", U.S. Appl. No. 12/541,731, dated Apr. 2, 2013, 8 pages.
"Notice of Allowance", U.S. Appl. No. 13/657,511, dated Nov. 4, 2013, 9 pages.
"Notice of Allowance", U.S. Appl. No. 13/804,425, dated Mar. 21, 2016, 9 pages.
"Notification Concerning Transmittal of International Preliminary Report on Patentability", PCT Application No. PCT/US2014/021295, dated Sep. 17, 2015, 12 pages.
"Part 11—Wireless LAN Medium Access Control (MAC) and Physical Layer (PHY) Specifications", Information Technology—Telecommunications & Information Exchange Between Systems . . . International Standard, ISO/IEC 8802-11, First Ed., Jan. 1, 1999, pp. 1-531.
"Part 16: Air Interface for Broadband Wireless Access Systems", IEEE Standard for Local and Metropolitan Area Networks, May 29, 2009, 2082 pages.
"Public Key Cryptography for the Financial Services Industry: Elliptic Curve Key Agreement and Key Transport Schemes", Working Draft; Version 2.0, Jul. 5, 1998, 125 pages.
"Restriction Requirement", U.S. Appl. No. 12/101,668, dated Sep. 22, 2011, 6 pages.
"Restriction Requirement", U.S. Appl. No. 13/676,701, dated Feb. 12, 2015, 7 pages.
"Specification of the Bluetooth System, Version 2.0: vol. 0", Master Table of Contents & Compliance Requirements; pp. 1-74; vol. 1, "Architecture & Terminology Overview", pp. 1-92; vol. 2, "Core System Package [Controller Volume]", pp. 1-814; vol. 4, "Core System Package [Host Volume]"; pp. 1-250, Nov. 4, 2004, 1230 pages.
"Specification Requirements Document (SRD) for Devise Provisioning Protocol", Wi-Fi Alliance Device Provisioning Protocol Marketing Task Group; Version 1.1, Jan. 1, 2013, 13 pages.
"Supplemental Notice of Allowance", U.S. Appl. No. 13/333,551, dated Oct. 23, 2012, 2 pages.
"Supplemental Notice of Allowance", U.S. Appl. No. 12/101,668, dated Feb. 8, 2013, 4 Pages.
"Wi-Fi Peer-to-Peer (P2P) Technical Specification", Wi-Fi Alliance Technical Committee P2P Task Group; Draft Version 1.14, Jun. 25, 2010, 154 pages.
"Wi-Fi Peer-to-Peer (P2P) Technical Specification", WiFi Alliance; Version 1.5, Jan. 1, 2014, 183 pages.
"Written Opinion", PCT Application No. PCT/IB2017/000230, dated Jul. 13, 2017, 7 pages.
Anderson, Dave "HDD Based Full Disc Encryption", In Proceedings of THIC Conference 2006, 12 pages.
Chen, Walter Y. "Home Network Basis: Transmission Environments and Wired/Wireless Protocols", Prentice Hall, Jul. 1, 2003, 19 pages.

(56) References Cited

OTHER PUBLICATIONS

Cooper, D et al., "Internet X.509 Public Key Infrastructure Certificate and Certificate Revocation List (SRL) Profile", Network Working Group; RFC 5280, May 1, 2008, 152 pages.

Harada, "Project: IEEE P802.15 Working Group for Wireless Personal Area Network (WPANs)", IEEE 802.15/07/0693-003c; Slides 24-33 as provided in U.S. Appl. No. 14/198,994 in an IDS submission filed Feb. 24, 2015, May 1, 2007, 10 pages.

Harkins, D "Synthetic Initialization Vecor (SIV) Authenticated Encryption Using the Advanced Encryption Standard (AES)", Network Working Group; RFC 5297; Aruba Networks, Oct. 1, 2008, 27 pages.

Hiertz, Guido R. et al., "The IEEE 802.11 Universe", IEEE Standards in Communications and Networking; IEEE Communications Magazine, Jan. 1, 2010, 9 pages.

Krawczyk, H et al., "HMAC-based Extract-and-Expand Key Derivation Function (HKDF)", Internet Engineering Task Forct (IETF); RFC 5869, May 1, 2010, 15 pages.

McGrew, D et al., "Fundamental Elliptic Curve Cryptography Algorithms", Internet Engineering Task Force (IETF); RFC 6090; Fundamental Elliptic Cryptography Algorithms, Feb. 1, 2011, 35 pages.

Menezes, A J. et al., "Chapter 12: Key Establishment Protocols ED", Handbook of Applied Cryptography; [CRC Press Series on Discrete Mathematices and its Applications], CRC Press, Boca Raton, FL, Oct. 1, 1996, pp. 489-541.

Perahia, Eldad et al., "Gigabit Wireless LANs: an overview of IEEE 802.11ac and 802.11ad", ACM SIGMOBILE Mobile Computing and Communications Review; vol. 15, No. 3, Nov. 29, 2011, pp. 23-33.

Robinson, Kevin et al., "Wi-Fi Simple Configuration Protocol and Usability Best Practices for the Wi-Fi Protected Setup Program", Wi-Fi Alliance; Version 2.0.1, Apr. 1, 2011, 30 pages.

Van Beijnum, I "Crypto Based Host Identifiers", Internet Draft; draft-van-beijnum-multi6-cbhi-00.txt; ISSN: 0000-0004; XP15036389A, Jan. 1, 2004, 9 pages.

"Foreign Office Action", European Application No. 17712820.4, dated Aug. 29, 2019, 6 pages.

"International Preliminary Report on Patentability", PCT Application No. PCT/IB2017/000230, dated Sep. 20, 2018, 9 pages.

* cited by examiner

METHODS AND APPARATUS FOR SECURE DEVICE AUTHENTICATION

CROSS REFERENCE TO RELATED APPLICATION

This present disclosure is a 371 filing of PCT Application No. PCT/IB2017/000230 which in turn claims priority to U.S. Provisional Patent Application Ser. No. 62/305,030 filed Mar. 8, 2016, the disclosures of which are incorporated by reference herein in their entireties.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Computing and electronic devices often access data or services of another device through a wireless communication link. To establish and configure the communication links, two devices typically exchange respective identifiers that are associated with each device. These identifiers can also be used to establish and maintain communications between the devices. Exchanging these identifiers, however, can be difficult or inconvenient, such as when complex user input or contact between the devices is required to initialize the wireless communication link.

Aside from these difficulties, the identifiers exposed during a link configuration process are often static or hard-coded into the devices. In other words, the identifiers not only make each device uniquely identifiable, but do not or cannot be changed over the lifetime of the device. As such, communications between the devices are often insecure and lack privacy because the same long term device identifiers are often exposed to third parties during the configuration process.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is described that exposes a public ephemeral key of a device. A message received from a remote device includes a hash of the public ephemeral key of the device, a public ephemeral key and encrypted public key of the remote device, and an encrypted hash value useful to prove ownership of the public key received from the remote device. An encryption key is generated based on the public ephemeral key of the remote device and a private ephemeral key of the device. The device then decrypts, with the encryption key, the encrypted public key of the remote device and the encrypted hash value. The remote device is then authenticated by verifying, based on the decrypted hash value, that the remote device owns the decrypted public key.

In other aspects, a method is described that receives, at a device, a first public ephemeral key from a remote device. An encryption key is generated based on the first public ephemeral key and a private ephemeral key of the device. A first public key of the device and a first hash value useful to prove ownership of the first public key are then encrypted with the encryption key. A first message is transmitted to the remote device that includes a hash of the first public ephemeral key, a second public ephemeral key of the device, the encrypted first public key of the device, and the first encrypted hash value. A second message received from the remote device includes a hash of the second public ephemeral key of the device, an encrypted second public key of the remote device, and a second encrypted hash value. The second encrypted public key and the second encrypted hash value are decrypted with the encryption key. The method then authenticates the remote device by verifying, based on the decrypted second hash value, that the remote device owns the second public key.

In yet other aspects, a secure authentication device comprises a communication interface, a hardware-based processor, and a memory storing processor-executable instructions that, responsive to execution by the processor, implement an authenticator. The authenticator may expose a public ephemeral key of the device. A message received from a remote device includes a hash of the public ephemeral key of the device, a public ephemeral key and encrypted public key of the remote device, and an encrypted hash value useful to prove ownership of the public key received from the remote device. The authenticator then generates an encryption key based on the public ephemeral key of the remote device and a private ephemeral key of the device. With the encryption key, the authenticator decrypts the encrypted public key of the remote device and the encrypted hash value. The remote device is then authenticated by verifying, based on the decrypted hash value, that the remote device owns the decrypted public key received from the remote device.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of secure device authentication are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Conventional techniques for configuring peer-to-peer network connections or groups often expose long term identifiers of the devices being configured. For example, some configuration processes exchange long term identifiers or public keys of each device through unencrypted wireless communications. Because these device identifiers and public keys are static, or the same for each configuration session and subsequent communications, third parties can exploit the lack of wireless privacy to identify the devices attempting to establish a peer connection or group. In cases in which the public key of the device is exposed, a malicious actor may further leverage the exposed key to implement other attacks on the device or communications of the device that rely on the public key for security.

This disclosure describes techniques and apparatuses for secure device authentication. In some aspects, a public ephemeral key of a device is exposed or broadcast. A message received from a remote device includes a hash of the public ephemeral key of the device, a public ephemeral key and encrypted public key of the remote device, and an encrypted hash value useful to prove ownership of the public key of the remote device. An encryption key (e.g., a shared key) is then generated based on the public ephemeral key of the remote device and a private ephemeral key of the device. The encrypted public key of the remote device and the encrypted hash value are then decrypted with the encryption key to provide an unencrypted public key and hash value. The remote device is then authenticated by verifying, based on the decrypted hash value, that the remote device owns the decrypted public key received from the remote device. By so doing, the remote device can be authenticated without exposing a public key or long term identifier of either device.

This and other aspects described herein may be implemented to provide a secure authentication protocol in which ephemeral or random keys of a device are exchanged instead of the public or identity key of the device. After an initial exchange of respective ephemeral keys, a public key or identifier of each device can be encrypted using the ephemeral keys to ensure privacy during authentication. In some cases, the authentication protocol provides a peer public key, based on a hash of the respective identities of the devices, without exposing the public keys during the exchange. By so doing, devices can authenticate and establish peer-to-peer networks or groups while maintaining wireless privacy.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

Figure 1:
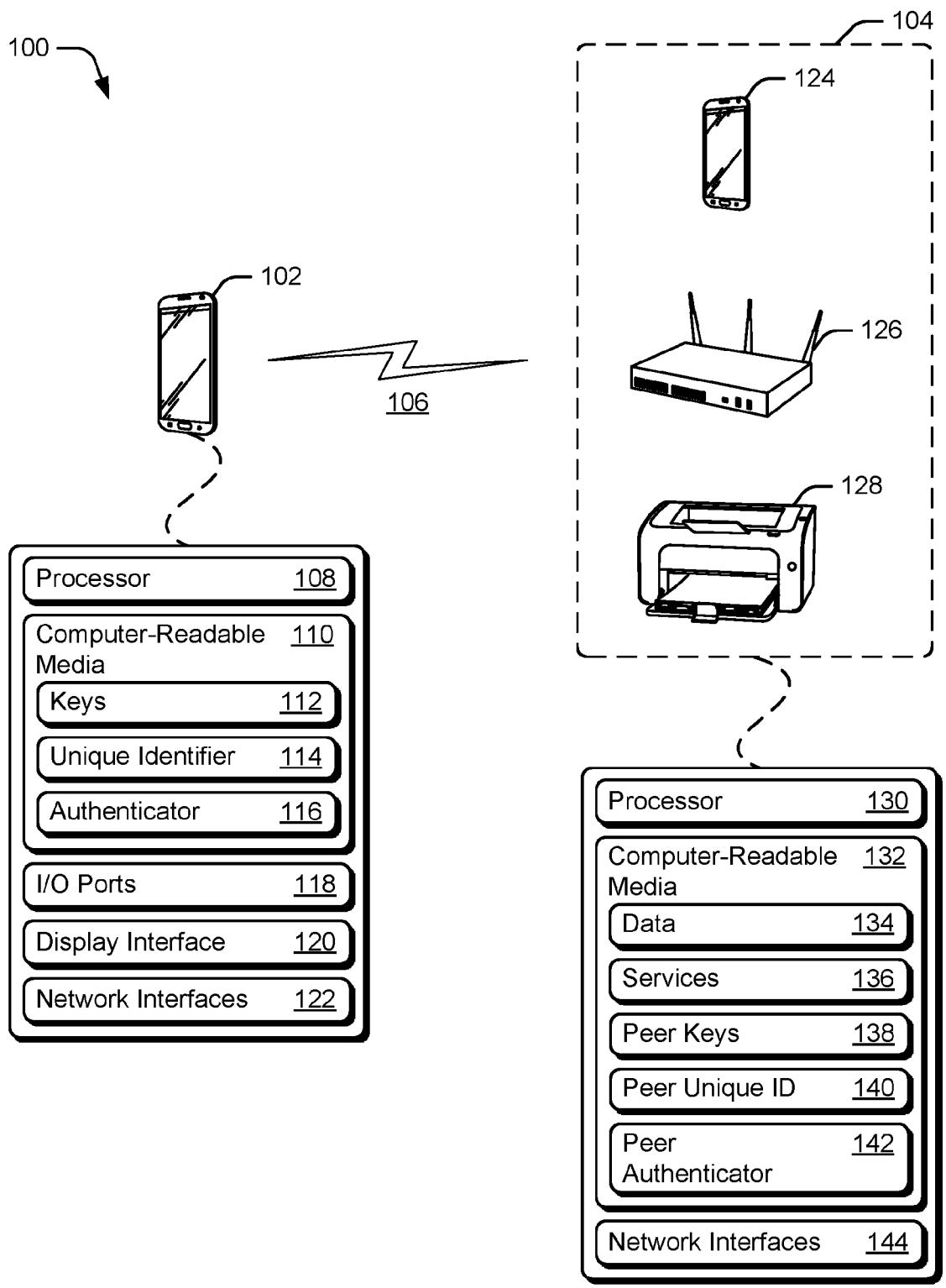
FIG. 1 illustrates an example operating environment that includes wireless devices implemented in accordance with one or more aspects.

FIG. 1 illustrates an example operating environment 100 that includes an example computing device 102 and example peer devices 104 in accordance with one or more aspects. Each of these devices may be wireless-network-enabled and capable of communicating data, packets, and/or frames over a wireless link 106. The wireless link 106 may include any suitable type of wireless communication link or wireless network connection. For example, the wireless link 106 may be implemented in whole or in part as a wireless local-area-network (WLAN), ad-hoc WLAN, wireless mesh network, near-field communication (NFC) link, wireless personal-area-network (WPAN), wireless wide-area-network (WWAN), or short-range wireless network. The wireless link 106 may also implement various peer-to-peer communication protocols such as a Wireless Fidelity (WiFi) Alliance compliant direct link or peer-to-peer link.

In this particular example, the computing device 102 is embodied as a smart-phone, though the computing device 102 may be implemented as any other suitable type of device. These other device types may include a tablet computer, laptop computer, netbook, wireless router, set-top box, or network-attached storage (NAS) device. Further examples of the computing device 102 include a desktop computer, camera, printer, multimedia dongle, personal media device, navigation device, portable gaming device, Internet-of-Things (IoT) device, and so on. The computing device 102 may implement cryptography or security functions for any suitable purpose, such as to establish secure communication links, encrypt/decrypt communications, authenticate users or other devices, sign electronic files or documents, and the like.

The computing device 102 includes a processor 108 and computer-readable media 110. The processor 108 can be any suitable type of processor, either single core or multi-core, for executing instructions or commands of an operating system or application of the computing device 102. The computer-readable storage media 110 (CRM 110) includes volatile memory and non-volatile memory for storing various data and instructions of the computing device 102. In the context of this disclosure, the CRM 110 is implemented as storage media, and thus does not include transitory signals or carrier waves.

The CRM 110 includes keys 112, a unique identifier 114, and an authenticator 116 of the computing device 102. The keys 112 may include any suitable type of keys, such as a hardware-based device root key, private keys, public keys, key pairs, and the like. The unique identifier 114 may identify the computing device 102 or services provided thereby. In some cases, the unique identifier 114 is created from one of the keys 112 and enables cryptographic validation of the device by other devices. Alternately or additionally, the computing device 102 may be marked or labeled with the unique identifier 114 to facilitate identification or authentication of the device. In some aspects, the authenticator 116 of the computing device 102 authenticates peer devices 104 and enables secure wireless communication with these devices. The implementations and uses of the keys 112, unique identifier 114, and authenticator 116 vary and are described throughout the disclosure.

The computing device 102 may also include I/O ports 118, display interface 120, and network interfaces 122. The I/O ports 118 allow the computing device 102 to interact with other devices or users. The I/O ports 118 may include any combination of internal or external ports, such as USB ports, audio ports, Serial ATA (SATA) ports, PCI-express based ports or card-slots, secure digital input/output (SDIO) slots, and/or other legacy ports. Various peripherals may be operably coupled with the I/O ports 118, such as human-input devices (HIDs), user input interfaces, bar code scanners, optical sensors, cameras, buttons, infrared ports, or other peripherals.

The display interface 120 enables presentation of a user interface or other graphics of the computing device 102 via a display connected to the interface. The display may be integrated with the computing device 102 or include an external display connected via a wired or wireless link. In some cases, a display of the device 102 includes an integrated touch screen or sensors through which user input can be received. For example, the computing device 102 may present, via the display, a prompt for alphanumeric input, and receive, via the touch screen, a sequence of input from a user of the computing device 102.

The network interfaces 122 of the computing device 102 provide connectivity to one or more networks and other devices connected therewith. Data communicated over network interfaces 122 may be packetized or framed depending on a communication protocol or standard by which the computing device 102 is communicating. The network interfaces 122 may include wired interfaces, such as Ethernet or fiber optic interfaces for communication over a local network, intranet, or the Internet. Alternately or additionally, the network interfaces 122 may include wireless interfaces that facilitate communication over wireless networks, such as cellular networks, WLANs, or WPANs.

In some aspects, a wireless network interface 122 is implemented as a wireless transceiver that is configured for communication via a particular communication protocol, such as 3rd Generation Partnership Project Long-Term Evolution (3GPP LTE), Bluetooth™, IEEE 802.11-2007, IEEE 802.11n, IEEE 802.11ac, IEEE 802.15.4, IEEE 802.16, Bluetooth™, NFC, and the like. Alternately or additionally, a wireless transceiver may be further configured to operate in one or more communication modes, such as infrastructure, peer-to-peer, mesh, peer-link, and the like.

Alternately, various functionalities of the network interface 122 may be implemented separately by a transmitter and receiver, and may be hardware combined with or separate from firmware or software. Each of the network interfaces 122 may include a media access control (MAC) layer interface and physical (PHY) layer interface, either of which may be hardware combined with or separate from firmware or software. In some cases, a computing device 102 is identifiable by a MAC address (e.g., a string of hexadecimal values) of a network interface 122 by which the device communicates.

The peer devices 104 include another smart-phone 124, a wireless router 126, and a printer 128, each of which is capable of communication with the computing device 102 via the wireless link 106. Other implementations of peer devices 104 may include a camera, multimedia dongle, personal multimedia player, personal navigation device, portable gaming device, Internet-of-Things (IoT) device, and so on. Alternately or additionally, any of the computing devices 102 described herein may be implemented as a peer device 104, such as when another device initiates a peer-to-peer connection with the computing device 102.

Each of the peer devices 104 also include processor 130 (e.g., a microprocessor) and computer-readable media 132 (CRM 132). The CRM 132 may include any suitable memory or storage device, such as random-access memory (RAM), read-only memory (ROM), or Flash memory useful to store data 134, services 136, firmware, and/or operating systems of the peer device 104. In some aspects, data 134 or services 136 of the peer device 104 can be accessed by the computing device 102 via the wireless link 106.

The CRM 132 of the peer device 104 also includes peer keys 138, a peer unique identifier 140 (Peer Unique ID 140), and a peer authenticator 142. The keys peer keys 138 may include any suitable type of keys, such as a hardware-based device root key, private keys, public keys, key pairs, and the like. The peer unique ID 140 may identify the peer device 104 or services provided thereby. In some cases, the peer unique ID 140 is created from one of the peer keys 138 and enables cryptographic validation of the peer device 104 by other devices. Alternately or additionally, the peer device 104 may be marked or labeled with the peer unique ID 140 to facilitate identification or authentication of the peer device. In some aspects, the peer authenticator 142 authenticates computing device 102 or other devices, and enables secure wireless communication with these devices. The implementations and uses of the peer keys 138, peer unique ID 140, and peer authenticator 142 vary and are described throughout the disclosure.

The peer devices 104 may also include I/O ports (not shown), a display interface (not shown), and network interfaces 144. The I/O ports or display interface of the peer device may be implemented similar to or differently from those of the computing device 102, such as to receive user or other input at the peer device 104. The network interfaces 144 provide connectivity to one or more networks and other devices connected therewith. The network interfaces 144 may include wired interfaces or wireless interfaces, such as those described with reference to the computing device 102.

In some aspects, a network interface 144 is implemented as a wireless transceiver that is configured for communication via a particular communication protocol, such as 3rd Generation Partnership Project Long-Term Evolution (3GPP LTE), Bluetooth™, IEEE 802.11-2007, IEEE 802.11n, IEEE 802.11ac, IEEE 802.15.4, IEEE 802.16, Bluetooth™, NFC, and others mentioned herein. Alternately or additionally, a wireless transceiver may be further configured to operate in one or more communication modes, such as infrastructure, peer-to-peer, mesh, peer-link, and the like.

Alternately, various functionalities of the network interface 144 may be implemented separately by a transmitter and receiver, and may be hardware combined with or separate from firmware or software. Each of the network interfaces 144 may include a media access control (MAC) layer interface and physical (PHY) layer interface, either of which may be hardware combined with or separate from firmware or software. In some cases, a peer device 104 is identifiable by a MAC address (e.g., a string of hexadecimal values) of a network interface 144 by which the peer device communicates.

Figure 2:
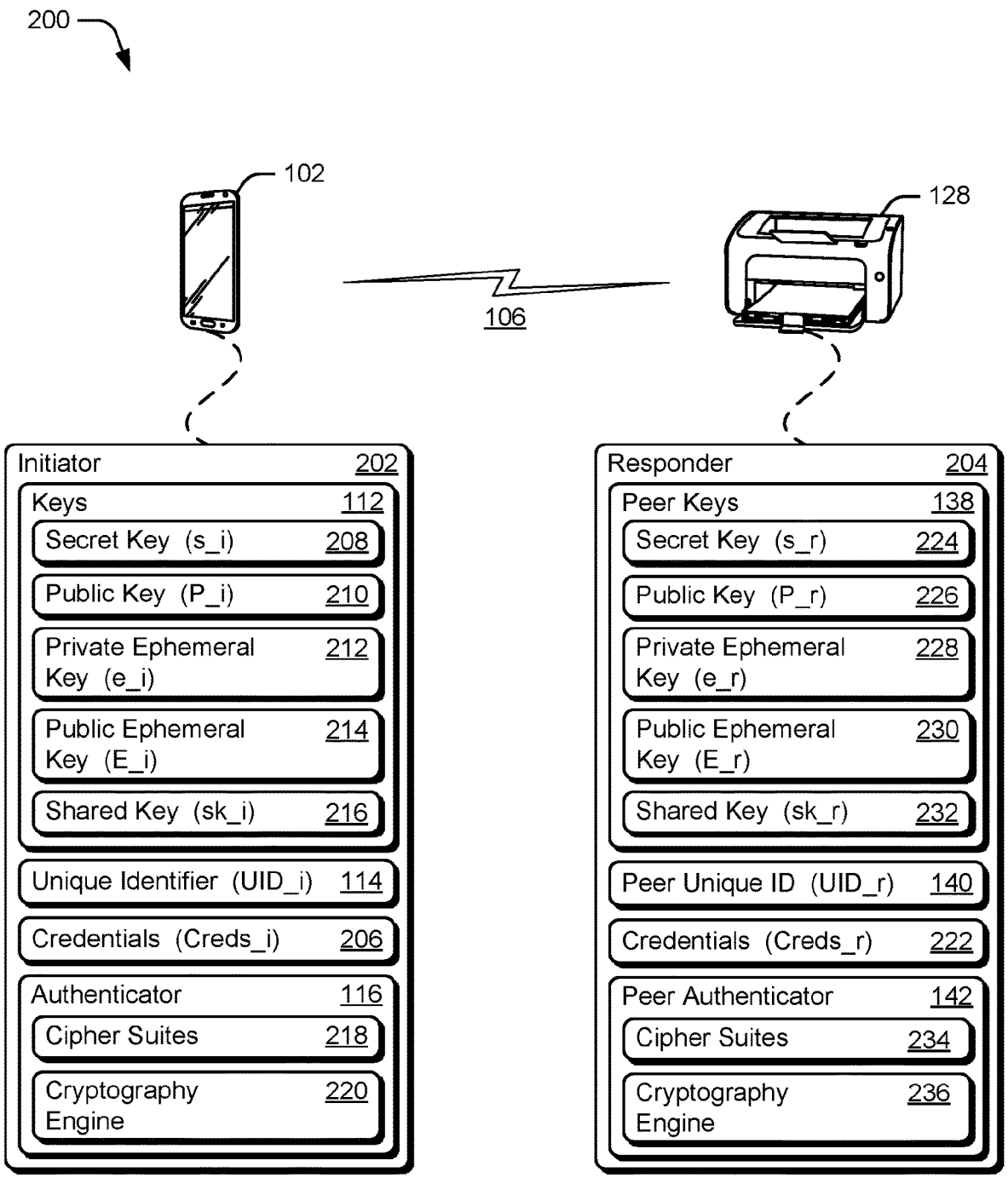
FIG. 2 illustrates example device configurations for an authentication initiator and responder in accordance with one or more aspects.

FIG. 2 illustrates examples device configurations for an authentication initiator and responder generally at 200. In this particular example, a computing device 102 is configured as an initiator 202 and a printer 128 is configured as a responder 204 of an authentication exchange. The computing device 102 (e.g., smart-phone) may initiate the authentication exchange with the printer 128 to establish a peer-to-peer network connection and access printing services provided by the printer 128. In other cases, a peer device 104 configured as an initiator 202 may initiate authentication with a computing device 102 configured as a responder 204. These device configurations are dynamic and may negotiated by the devices or a third party prior to authentication.

Each of the initiator 202 and responder 204 are capable of cryptographic operations and may support any suitable type of cryptosystem, such as elliptic-curve cryptography (ECC), elliptic-curve Diffie-Hellman (ECDH) cryptography, and variations thereof. As such, the initiator 202 or the responder 204 may include or generate various keys, hashes, numbers-used-once (nonces), or encrypted data to provide a secure authentication protocol. With reference to the figures and for increased clarity, entities or operations associated with the initiator 202 or the responder 204 may be identified with a suffix of "_i" or "_r" for initiator or responder, respectively. It should be noted, however, that the responder and initiator device roles are configurable and dynamic, and thus may vary over time or with reference to another device or authentication session.

In some aspects, the initiator 202 includes keys 112, a unique identifier 114, credentials 206, and an authenticator 116. The keys 112 of the initiator 202 include a secret key 208 and public key 210, which are cryptographically linked such that the secret key 208 can be useful to prove ownership of the public key 210. The secret key 208 is a private key of the initiator 202 and may be tied to hardware of the initiator device. For example, the secret key 208 can be generated during manufacture of the initiator 202 and burned into one-time-programmable (OTP) memory of the initiator 202. The public key 210 of the initiator 202 may be generated based on the secret key 208, such as by multiplying the secret key 208 by a generator value of an elliptical encryption curve. In some cases, the public key 210 is an identifier (e.g., long term identifier or public ID) shared by the initiator 202 to establish secure authenticated communications. Alternately or additionally, the public key 210 can be associated with hardware of the initiator 202 and persist through device resets.

The keys 112 of the initiator 202 also include an ephemeral key pair of a private ephemeral key 212 and a public ephemeral key 214. These ephemeral keys may be random keys used for any suitable amount of time or specific session, such as an authentication or key establishment process. The private ephemeral key 212 may be randomly generated and protected locally by the initiator 202. In some cases, the initiator 202 generates a public ephemeral key 214 based on the private ephemeral key 212, such as by multiplying the private ephemeral key 212 by a generator value of an elliptical encryption curve. Thus, the private ephemeral key 212 may be useful to prove ownership of the public ephemeral key 214. Alternately or additionally, the ephemeral key pair may be used to generate shared keys with other devices. In some cases, the public ephemeral key 214 shared by the initiator 202 to privately establish authenticated communications.

The shared key 216 may be generated by the initiator 202 during an authentication process or other cryptographic exchange with the responder 204. For example, the initiator 202 may generate a master or shared key based on a public key of the responder 204 and a private key, such as private ephemeral key 212. In some cases, the shared key 216 is used to encrypt information prior to transmission to the responder 204 and decrypt information received from the responder 204. Alternately or additionally, the initiator 202 may generate the shared key 216 based on a nonce, other key input information, or a combination of static and ephemeral keys.

The unique identifier 114 of the initiator 202 may be generated from the public key 210, such as through the use of a hash function. The initiator 202 may also be marked with the unique identifier 114 to enable or facilitate identification of the initiator 202 or services provided thereby. In some cases, a third party, such as an authentication server provides the unique identifier 114 based on a device key (e.g., public key 210) provided to the server. In such cases, the server may associate and store the unique identifier 114 with the device key to enable strong authentication.

In some aspects, the initiator 202 also includes credentials 206 that are useful to further identify, validate, or authenticate the initiator 202. Example credentials 206 may include self-declared group or network names, certificates, signed attestations, and the like. Thus, some credentials 206 may be signed by another device or third party to further attest that a particular credential or associated key is valid. Alternately or additionally, the credentials 206 may include or identify services, capabilities, device attributes, or networks accessible through authentication with the initiator 202.

The initiator 202 also includes an authenticator 116 for managing authentication with the responder 204. In this particular example, the authenticator 116 includes cipher suites 218 and cryptography engine 220. The cipher suites 218 may include a set of authentication, encryption, message authentication code (MAC), and key exchange algorithms useful to implement encryption and authentication operations. Examples of these algorithms include hash functions or hash-based MAC key derivation function (HKDFs) that provide hash values or keys for cryptographic and other types of operations. In some cases, use of a particular cipher suite 218 is identified or negotiated when the initiator 202 initiates an authentication protocol with the responder 204.

The cryptography engine 220 of the authenticator 116 is used to implement functions and algorithms of the cipher suites 218. The cryptography engine 220 may include any suitable cryptography block or module, such as a random number generator, salting modulator, hashing module, and the like. A random number generator of the cryptography engine 220 can provide random numbers for generating various keys, such as the public and private ephemeral keys. A hashing module of the cryptography engine 220 may implement any set of cryptographic hash functions or comply with a particular standard, such as SHA256.

In some aspects, the responder 204 includes peer keys 138, a peer unique ID 140, credentials 222, and a peer authenticator 142. Entities or components of the responder 204 may be implemented similar to those of the initiator 202. As such, similar entities of the responder 204 (e.g., keys or authenticator) may be implemented in ways described with reference to those of the initiator 202.

The peer keys 138 of the responder 204 include a secret key 224 and public key 226, which are cryptographically linked such that the secret key 224 can be useful to prove ownership of the public key 236. The secret key 224 is a private key of the responder 204 and may be tied to hardware of the responder device. The public key 226 of the responder 204 may be generated based on the secret key 224, such as by multiplying the secret key 224 by a generator value of an elliptical encryption curve. In some cases, the public key 226 is an identifier (e.g., long term identifier or public ID) shared by the responder 204 to publish available services or establish secure authenticated communications. Alternately or additionally, the public key 226 can be associated with hardware of the responder 204 and persist through device resets.

The peer keys 138 of the responder 204 also include an ephemeral key pair of a private ephemeral key 228 and a public ephemeral key 230. These ephemeral keys may be random keys used for any suitable amount of time or specific communication session, such as an authentication or key establishment process. The private ephemeral key 228 may be randomly generated and protected locally by the responder 204. In some cases, the responder 204 generates the public ephemeral key 230 based on the private ephemeral key 228, such as by multiplying the private ephemeral key 228 by a generator value of an elliptical encryption curve. Thus, the private ephemeral key 228 may be useful to prove ownership of the public ephemeral key 230. Alternately or additionally, the ephemeral key pair may be used to generate shared keys with other devices. In some cases, the public ephemeral key 230 is shared by the responder 204 to privately establish authenticated communications.

The shared key 232 may be generated by the responder 204 during an authentication process or other cryptographic exchange with the initiator 202. In some cases, the shared key 232 is used to encrypt information prior to transmission to the initiator 202 and decrypt information received from the initiator 202. Alternately or additionally, the responder 204 may generate the shared key 232 based on a nonce, other input key material, or a combination of static and ephemeral keys.

The unique identifier 140 of the responder 204 may be generated from the public key 226, such as through the use of a hash function. The responder 204 may also be marked with the unique identifier 140 to enable or facilitate identification of the responder 204 or services provided thereby. In some cases, the responder 204 includes credentials 222 that are useful to further identify, validate, or authenticate the responder 204. Alternately or additionally, the credentials 222 may include or identify services, capabilities, device attributes, or networks accessible through authentication with the responder 204.

The responder 204 also includes a peer authenticator 142 for managing authentication with the initiator 202. The peer authenticator 142 may be implemented similar to, or differently from, the authenticator 116 of the initiator. In this particular example, the peer authenticator 142 includes cipher suites 234 and cryptography engine 236. The cipher suites 234 may include a set of authentication, encryption, message authentication code (MAC), and key exchange algorithms useful to implement encryption and authentication operations. The cryptography engine 236 of the authenticator 116 is used to implement functions and algorithms of the cipher suites 218. The cryptography engine 220 may include any suitable cryptography block or module, such as a random number generator, salting modulator, hashing module, and the like.

Techniques of Secure Device Authentication

The following discussion describes techniques of secure device authentication. These techniques can be implemented using any of the environments and entities described herein, such as the keys 112, peer keys 138, authenticator 116, peer authenticator 142, cryptography engine 220, and/or cryptography engine 236. These techniques include methods illustrated in FIGS. 3, 5, 6a, 6b, 8a, and 8b each of which is shown as a set of operations performed by one or more entities. These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limiting described aspects to operating environment 100 but rather as illustrative of one of a variety of examples.

Figure 3:
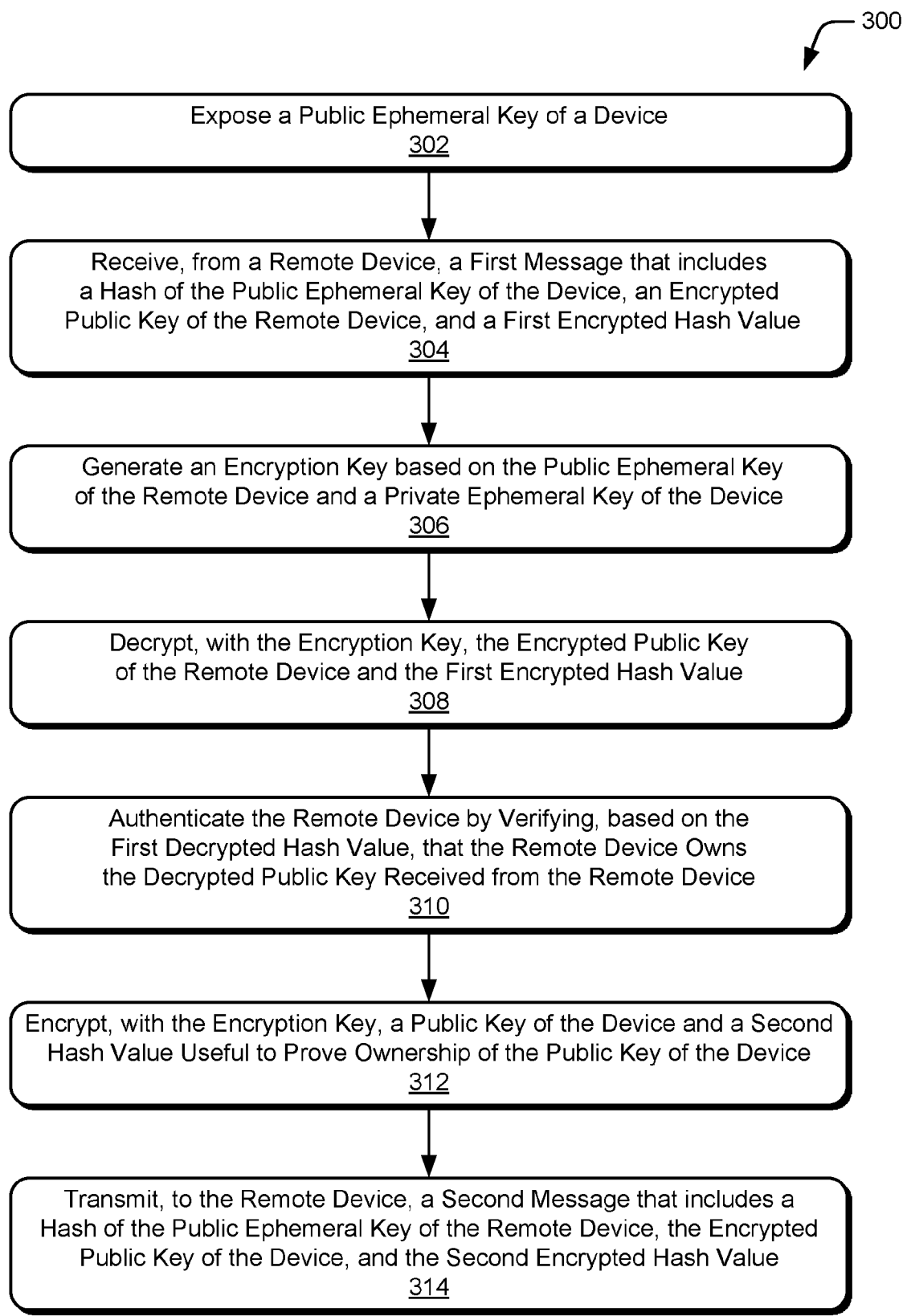
FIG. 3 illustrates an example method for securely authenticating a remote device.

FIG. 3 depicts an example method 300 for securely authenticating a remote device, including operations performed by the authenticator 116 and/or cryptography engine 220. In some aspects, operations of method 300 may be implemented to provide a secure authentication protocol between devices to ensure wireless privacy during the authentication process.

At 302, a public ephemeral key of a device is exposed. In some cases, the public ephemeral key is exposed by broadcasting the public ephemeral key via a wireless interface of the device. In other cases, the public ephemeral key is exposed via near-field communication (NFC), radio frequency identification (RFID), a personal area network (e.g., low-power BlueTooth™), or a display of the device. Alternately or additionally, parameters of a key exchange, such as a cipher suite identifier can be exposed with the public ephemeral key of the device.

Figure 4:
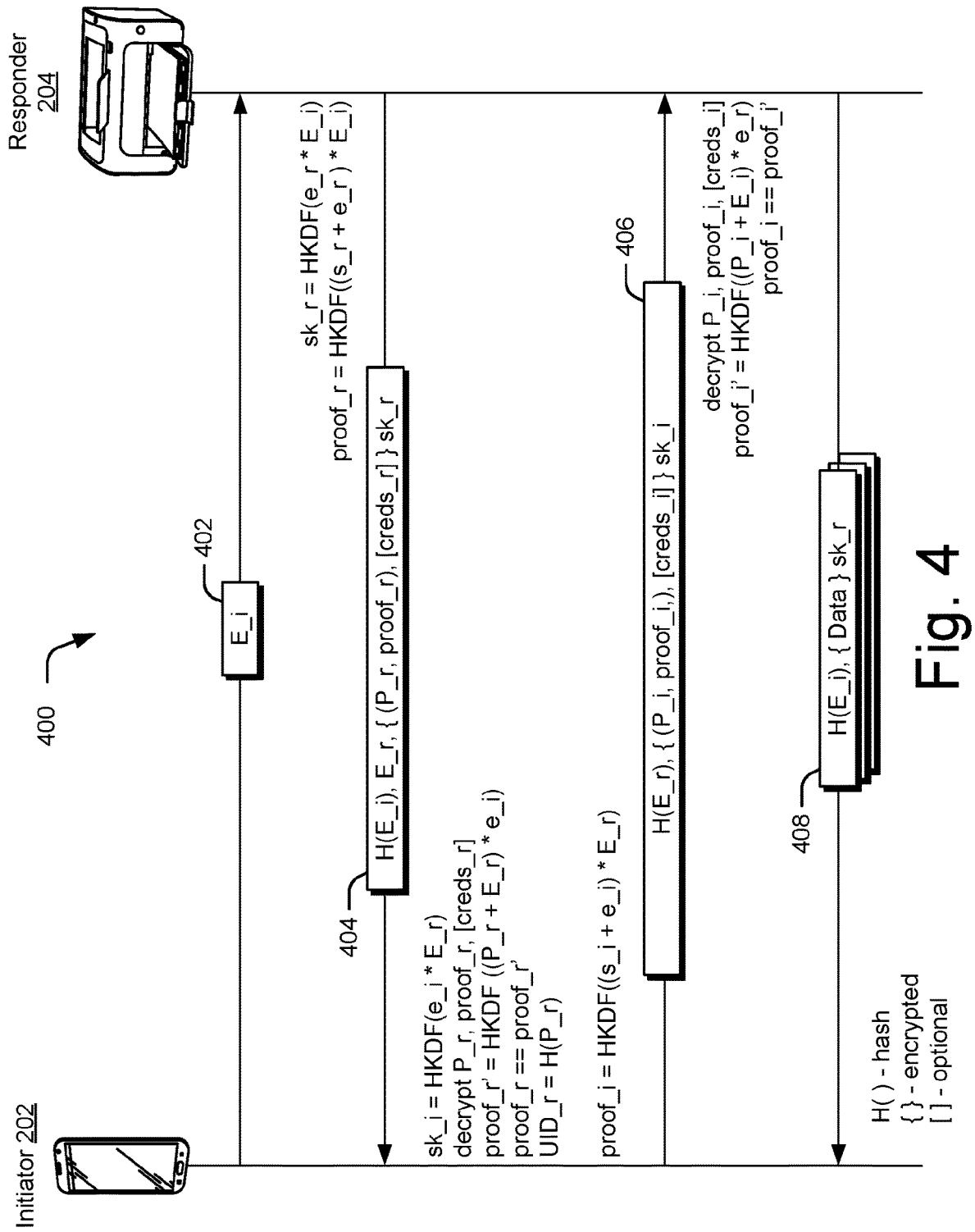
FIG. 4 illustrates an example exchange of authentication information between an initiator and a responder.

By way of example, consider the computing device 102 (smart-phone) and printer 128 of FIG. 2 in which the devices are configured as an initiator 202 and responder 204, respectively. Here, assume that a user of the smart-phone is attempting to access services of the printer 128. The authenticator 116 transmits, via a network interface 122 (e.g., WLAN) of the smart phone, the public ephemeral key 214 of the initiator 202 to the responder 204. FIG. 4 illustrates an example exchange of this authentication information generally at 400. As shown in FIG. 4, the initiator 202 transmits, to the responder 204, an authentication request 402 that includes the public ephemeral key 214 of the initiator 202.

Referring now back to FIG. 3, at 304, a first message is received from a remote device that includes a hash of the public ephemeral key of the device and an encrypted public key of the remote device. The message may also include a first hash value or first tag that is useful to prove ownership of the public key of the remote device. In some cases, the first hash value or first tag are encrypted with a shared encryption key. Alternately or additionally, the first message can include encrypted credentials, network information, or an indication of capabilities of the remote device.

In the context of the present example, the initiator 202 receives an authentication response 404 from the responder 204 that includes a hash of the public ephemeral key 214 of the initiator, the public ephemeral key 230 of the responder 204, an encrypted public key 226 of the responder, and proof of the responder's ownership of the public key 226 (proof_r).

At 306, an encryption key is generated based on the public ephemeral key of the remote device and a private ephemeral key of the device. In some cases, this encryption key is a shared encryption key that is useful encrypt authentication information exchanged between an initiator and responder. By so doing, the initiator and responder can exchange public keys through encrypted communication, which can prevent exposure the public keys during the authentication process. Continuing the ongoing example, the authenticator 116 uses an HKDF to provide a shared key 216 based on a private ephemeral key 212 of the initiator 202 and the public ephemeral key 230 of the responder 204.

At 308, the encrypted public key of the remote device and first hash value are decrypted with the encryption key. Other encrypted contents of the first message, such as credentials or capabilities of the remote device, may also be decrypted with the encryption key. In the context of the present example, the authenticator 116 decrypts the encrypted public key 226 of the responder and proof of ownership (proof_i) of the public key 226.

At 310, the remote device is authenticated by verifying, based on the decrypted first hash value, that the remote device owns the decrypted public key. In some cases, the decrypted first hash value is compared with verifying information or another hash value to determine ownership of the public key. In such cases, the verification information can be generated based on the public key of the remote device, the public ephemeral key of the remote device, or a private ephemeral key of the device.

Continuing the ongoing example, the authenticator 116 uses as HKDF to generate verification information (proof_r') based on the public key 226 of the responder, the public ephemeral key 230 of the responder, and a private ephemeral key 212 of the initiator. The authenticator 116 then compares the responder's proof of ownership (proof_r) with the verification information (proof_r'). In response to verifying that the responder 204 owns the public key 226, the authenticator 116 authenticates the responder 204. With the public key 226 of the responder 204, the authenticator 116 may also determine a unique ID 140 of the responder 204 via a corresponding hash function of the cipher suite 218.

At 312, a public key of the device and second hash value useful to prove ownership of the public key are encrypted with the encryption key. Encrypting the public key of the device can be effective to prevent exposure of the public key and increase privacy of the authentication process. In some cases, the public key is encrypted with the shared key that is used to decrypt the public key of the remoted device. Alternately or additionally, operation 312 may include generating the second hash value based on a private key of the device and other ephemeral keys.

In the context of the present example, the authenticator 116 uses an HKDF to provide proof of the initiator's ownership (proof_i) of the public key 210 based on the secret key 208 and private ephemeral key 212 of the initiator and the public ephemeral key 230 of the responder. The authenticator 116 then encrypts the public key 210 of the initiator 202 and the initiator's proof of ownership of the public key 210.

At 314, a second message is transmitted to the remote device that includes a hash of the public ephemeral key of the remote device and the encrypted public key of the device. The second message may also include a second encrypted hash value that is useful to determine ownership of the public key of the device. Alternately or additionally, encrypted credentials, network information, or an indication of capabilities of the device can also be transmitted as part of the second message. Subsequent to authenticating the remote device or responsive to transmitting the second message, the device may receive encrypted data from the remote device indicating (or confirming) mutual authentication of the device.

Concluding the present example, the authenticator 116 transmits an authentication confirmation 406 that includes a hash of the public ephemeral key 230 of the responder 204, the encrypted public key 210 of the initiator 202, and the encrypted proof of ownership of the public key 210.

Figure 5:
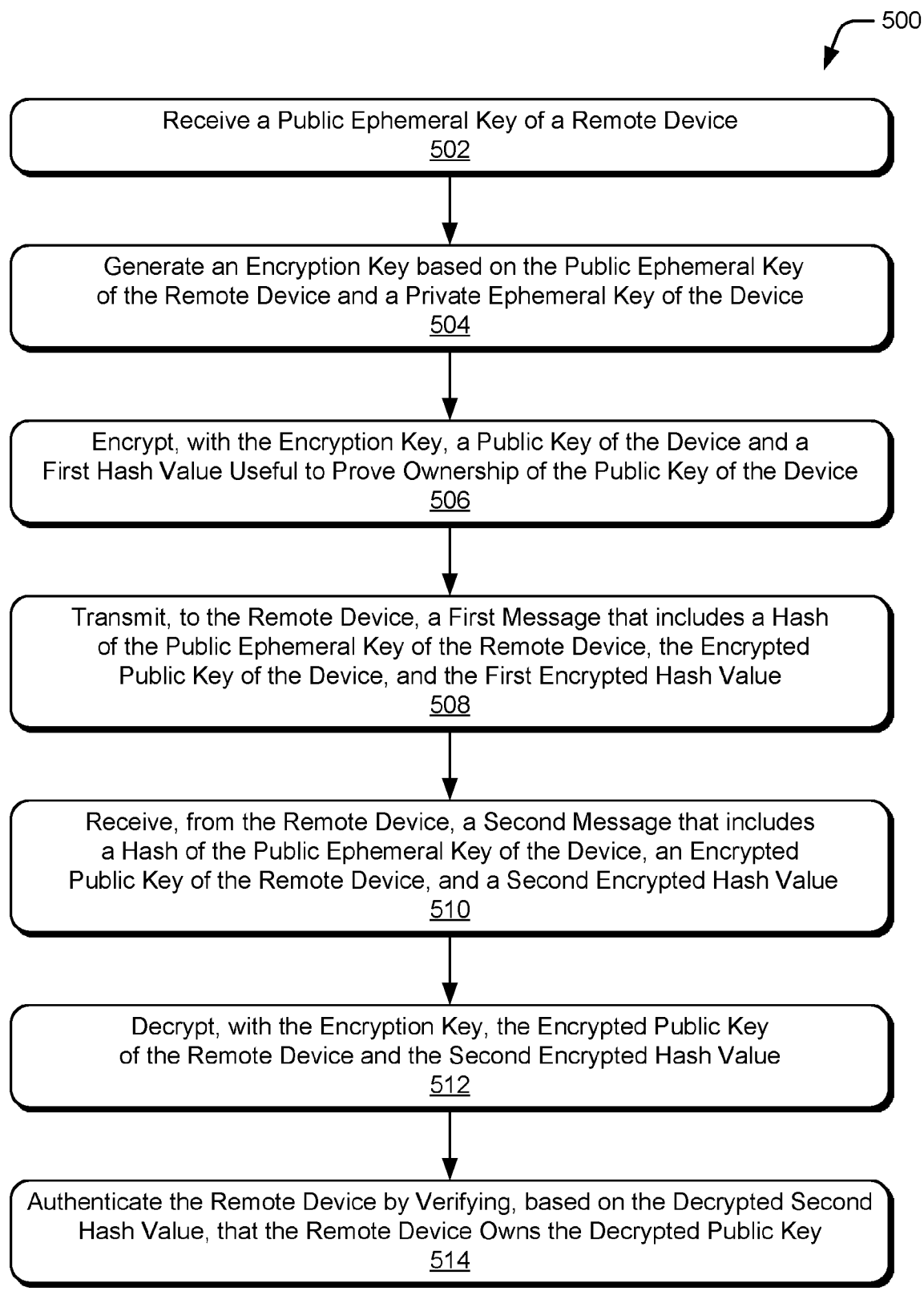
FIG. 5 illustrates another example method for securely authenticating with a remote device.

FIG. 5 depicts an example method 500 for securely authenticating with a remote device, including operations performed by the peer authenticator 142 and/or cryptography engine 236. In some aspects, operations of method 500 may be implemented to provide a secure authentication protocol between devices to ensure wireless privacy during the authentication process.

At 502, a public ephemeral key of a remote device is received at a device. The public ephemeral key may be received via any suitable interface of the device, such as a wireless network interface, camera, NFC module, RFID module, WPAN radio, or user-input interface. Alternately or additionally, parameters of a key exchange, such as a cipher suite identifier, can be received with the public ephemeral key of the device.

By way of example, consider again the smart-phone and printer 128 of FIG. 2 in which the devices are configured as an initiator 202 and responder 204, respectively. Similar to the previous example, assume that a user of the smart-phone is attempting to access services of the printer 128. In the context of operations of method 500, the peer authenticator 142 of the printer 128 receives, via a network interface 144 (e.g., WLAN), the public ephemeral key 214 of the initiator 202. As shown in FIG. 4, the responder 204 receives an authentication request 402 that includes the public ephemeral key 214 of the initiator 202.

At 504, an encryption key is generated based on the public ephemeral key of the remote device and a private ephemeral key of the device. In some cases, this encryption key is a shared encryption key that is useful encrypt authentication information exchanged between an initiator and responder. In the ongoing example, the peer authenticator 142 uses an HKDF to provide a shared key 232 based on a private ephemeral key 228 of the responder 204 and the public ephemeral key 214 of the initiator 202.

At 506, a public key of the device is encrypted with the encryption key. The public key may be encrypted with an encryption key shared by the device and the remote device. A first hash value useful to prove ownership of the public key by the device may also be encrypted with the encryption key. In some cases, the first hash value is provided by generating a hash based on a secret key and private ephemeral key of the device and the public ephemeral key of the remote device.

In the context of the present example, the peer authenticator 142 uses an HKDF to provide a first hash value proving the responder's ownership of the public key 226 (proof_r) based on the secret key 224 and private ephemeral key 228 of the responder 204 and the public ephemeral key 214 of the initiator 202. The peer authenticator 142 of the responder 204 then encrypts its public key 226 and the first hash value with the shared encryption key 232.

At 508, a first message is transmitted to the remote device that includes a hash of the public ephemeral key of the remote device and the encrypted public key of the device. The first message may also include the first encrypted hash value that is useful to prove ownership of the public key of the device. Alternately or additionally, encrypted credentials, network information, or an indication of capabilities of the responder may also be transmitted as part of the first message.

Continuing the ongoing example, the peer authenticator 142 transmits an authentication response to the initiator 202 that includes a hash of the public ephemeral key 214 of the initiator and the public ephemeral key 230 of the responder 204. The authentication response also includes an encrypted public key 226 of the responder 204 and the first encrypted hash value proving the responder's ownership of the public key 226.

At 510, a second message is received from the remote device that includes a hash of the public ephemeral key of the device and an encrypted public key of the remote device. The second message may also include a second encrypted hash value that is useful to prove ownership of the public key by the remote device. Alternately or additionally, the second message may include encrypted credentials, network information, or an indication of capabilities of the remote device. In the context of the present example, the peer authenticator 142 receives an authentication confirmation 406 that includes a hash of the public ephemeral key 230 of the responder 204, the encrypted public key 210 of the initiator 202, and the encrypted proof of ownership of the public key 210 (proof_i).

At 512, the encrypted public key of the remote device is decrypted with the encryption key. A second hash value received with the public key of the remote device may also be decrypted with the encryption key. In some cases, other encrypted contents of the second message, such as credentials or capabilities of the remote device, are also be decrypted with the encryption key. Continuing the ongoing example, the peer authenticator 142 decrypts the encrypted public key 210 of the initiator 202 and the encrypted proof of ownership of the public key 210.

At 514, the remote device is authenticated by verifying, based on the decrypted second hash value, that the remote device owns the decrypted public key received from the remote device. In some cases, the decrypted second hash value is compared with verifying information or another hash value to determine ownership of the public key. In such cases, the verification information can be generated based on the public key of the remote device, the public ephemeral key of the remote device, or a private ephemeral key of the device.

Concluding the present example, the peer authenticator 142 uses an HKDF to generate verification information (proof_i') based on the public key 210 of the initiator, the public ephemeral key 214 of the initiator, and a private ephemeral key 228 of the responder. The authenticator 116 then compares the initiator's proof of ownership (proof_i) with the verification information (proof_i'). In response to verifying that the initiator 202 owns the public key 210, the peer authenticator 142 authenticates the initiator 202. The authenticator then transmits encrypted data 408 to the initiator 202 with a hash of the public ephemeral key 214 to confirm authentication.

Figure 6A:
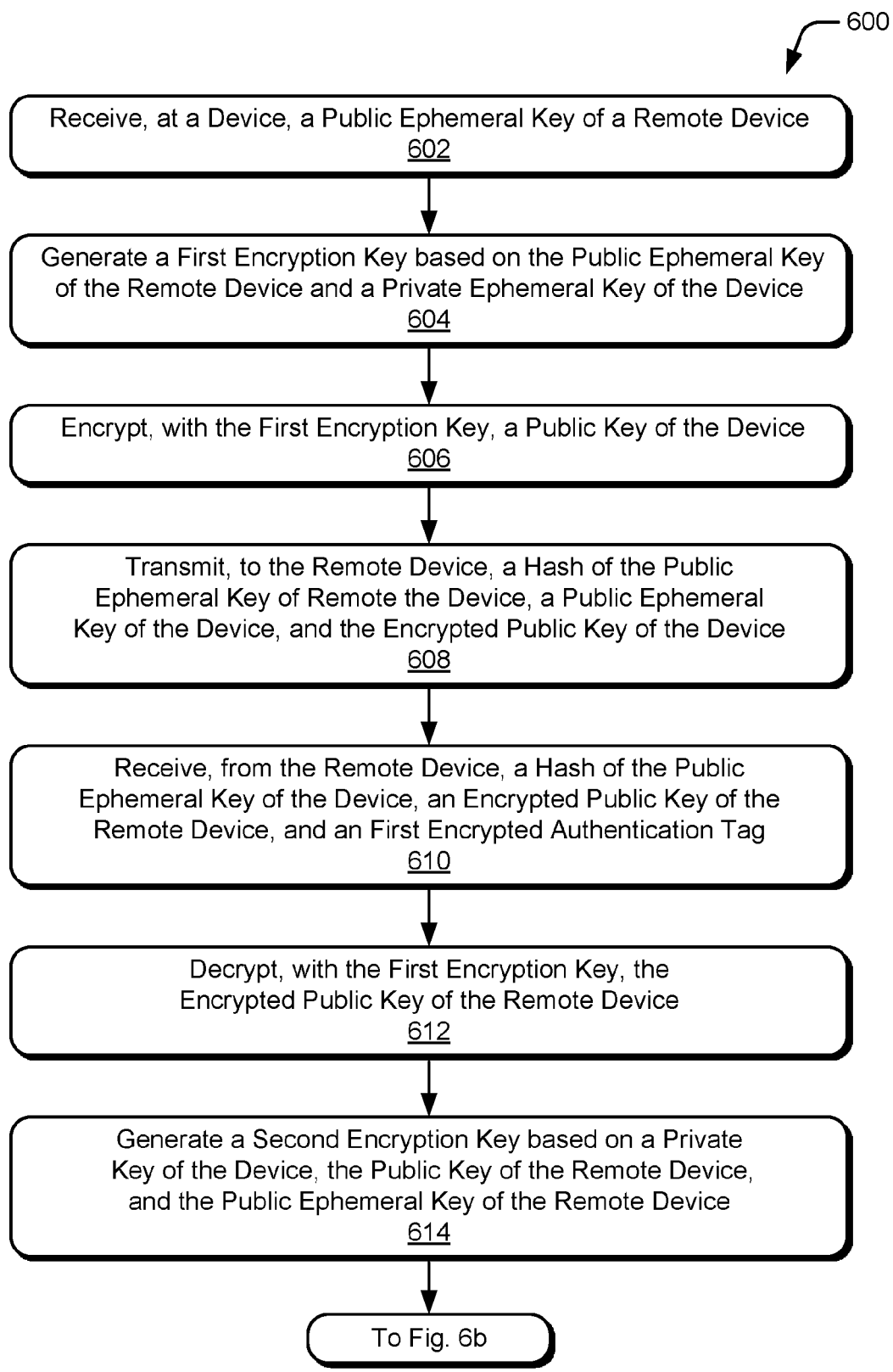
FIGS. 6a and 6b illustrate an example method for authenticating a device based on an ephemeral key of the device.
Figure 6B:
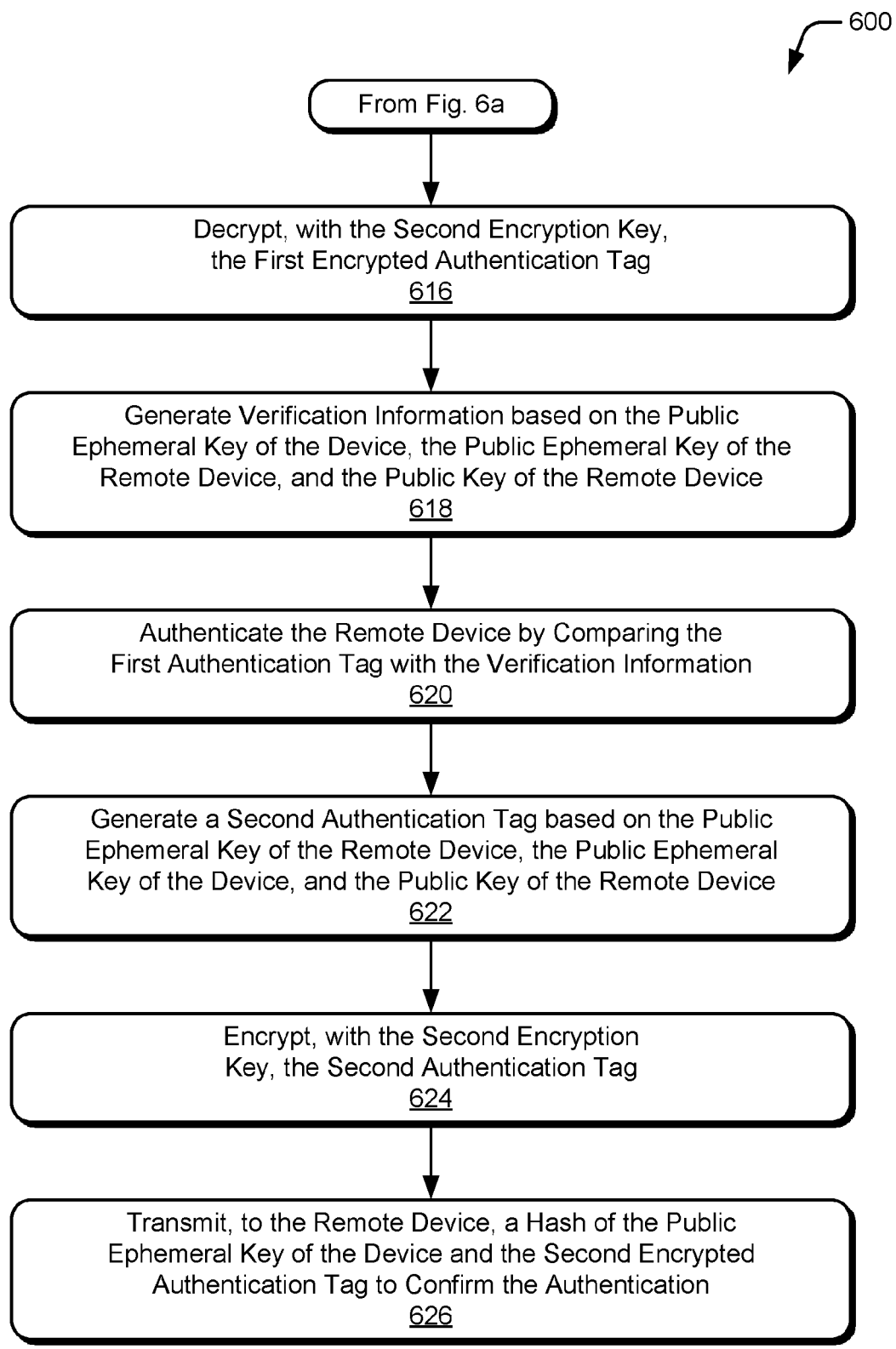

FIGS. 6a and 6b depict an example method 600 for authenticating a device using ephemeral keys, including operations performed by the authenticator 116 and/or cryptography engine 220 of an initiator 202. In some aspects, operations of method 600 may be implemented to provide a secure authentication protocol between devices to ensure wireless privacy during the authentication process.

At 602, a public ephemeral key of a remote device is received at a device. The public ephemeral key may be received via any suitable interface of the device, such as a wireless network interface, optical sensor, NFC module, RFID module, WPAN radio, or user-input interface. Alternately or additionally, parameters of a key exchange, such as a cipher suite identifier, can be received with the public ephemeral key of the device.

Figure 7:
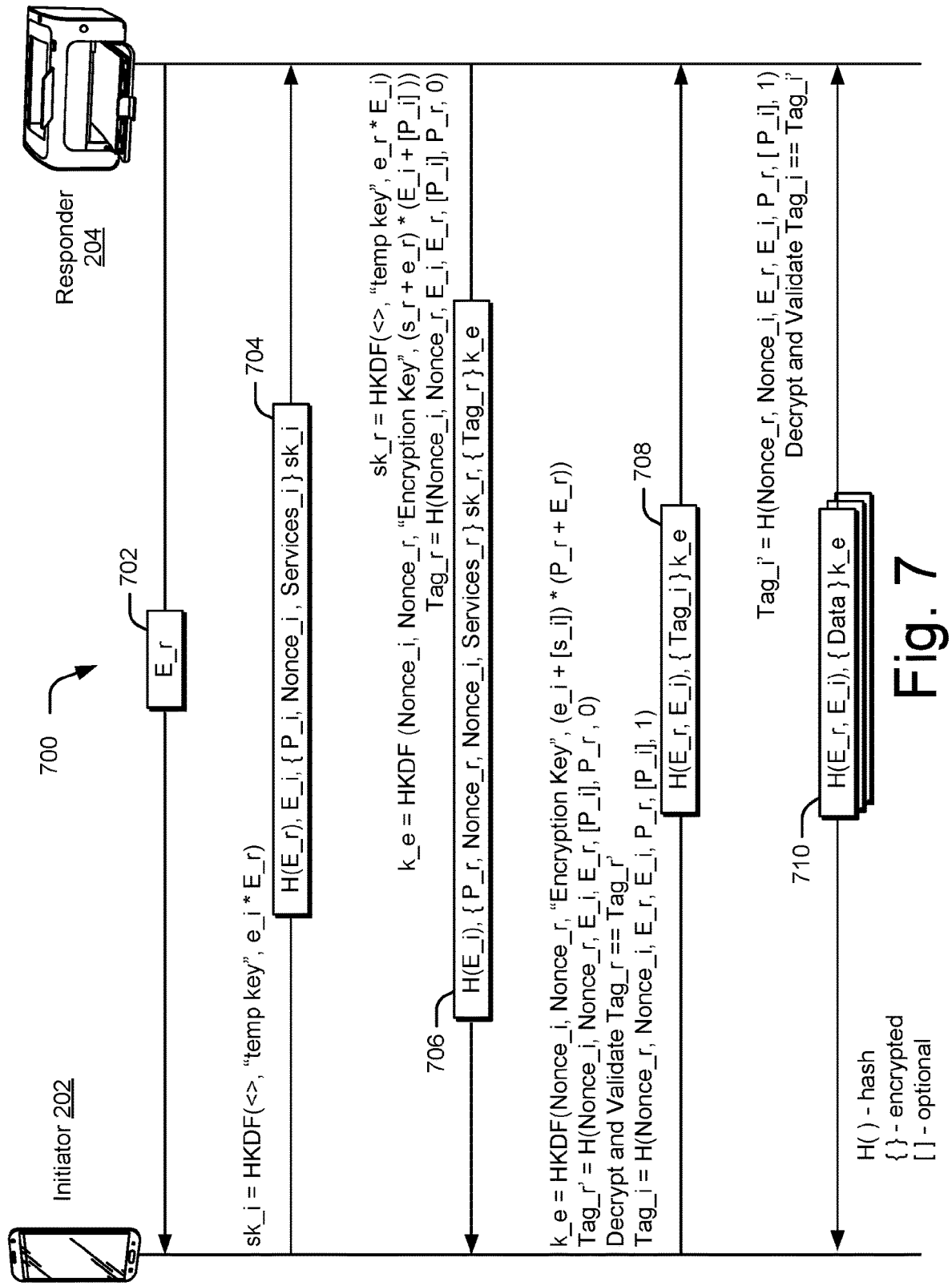
FIG. 7 illustrates an example exchange of ephemeral keys and encrypted authentication information in accordance with one or more embodiments.

By way of example, consider the smart-phone and printer 128 of FIG. 2 in which the devices are configured as an initiator 202 and responder 204, respectively. Here, assume that a user of the smart-phone is attempting to access services of the printer 128. To do so, the user initiates a network connection application of the printer 128, which then displays a quick response code (QR code) that includes the public ephemeral key 230 of the printer. The user then scans, with an optical sensor of the smart-phone, the QR code such that the authenticator 116 receives the public ephemeral key 230 of the responder 204. FIG. 7 illustrates an exchange of authentication information generally at 700, including this reception of the QR code 702 having the public ephemeral key 230 of the printer 128.

At 604, a first encryption key is generated based on the public ephemeral key of the remote device and a private ephemeral key of the device. The first encryption key may also include a self-declared key name or other information useful to identify the authentication session. In some cases, this encryption key is a shared encryption key that is useful encrypt authentication information exchanged between an initiator and responder. Continuing the ongoing example, the authenticator 116 uses an HKDF to provide a shared key 216 (e.g., an intermediate key) based on a private ephemeral key 212 of the initiator 202 and the public ephemeral key 230 of the responder 204.

At 606, a public key of the device is encrypted with the first encryption key. A nonce, an indication of services, or an indication of capabilities of the device may also be encrypted with the first encryption key. In the context of the present example, the authenticator 116 encrypts the public key 210, a nonce (nonce_i), and an indication of services provided (or requested) by the initiator 202 (smart-phone).

At 608, a hash of the public ephemeral key of the remote device, a public ephemeral key of the device, and the encrypted public key of the device are transmitted to the remote device. In some cases, the device also transmits an encrypted nonce, indication of services, or indication of capabilities of the device with the encrypted public key of the device. Continuing the ongoing example, the authenticator 116 transmits an authentication request 704 to the responder 204 that includes a hash of the public ephemeral key 230 of the responder 204, a public ephemeral key 214 of the initiator 202, an encrypted public key 210 and nonce.

At 610, a hash of the public ephemeral of the device, an encrypted public key of the remote device, and a first encrypted authentication tag are received from the remote device. The contents of the first authentication tag may be useful to determine ownership of the public key of the remote device. In some cases, the public key of the remote device and the first encrypted authentication tag are encrypted with different keys. In such cases, the first authentication tag can be encrypted with a second encryption key established through the exchange of ephemeral keys. In the context of the present example, the authenticator 116 receives an authentication response 706 from the responder 204 that includes a hash of the public ephemeral key 214 of the initiator, an encrypted public key 226 of the responder, encrypted nonces, and a first encrypted authentication tag.

At 612, the encrypted public key of the remote device is decrypted with the first encryption key. In some cases, other encrypted material received with the encrypted public key is decrypted with the first encryption key. In such cases, the other encrypted material may include nonces or an indication of services provided by the responder. Continuing the ongoing example, the authenticator 116 decrypts the encrypted public key 226 of the responder, nonces, and an indication of printing services provided by the printer 128.

At 614, a second encryption key is generated based on a private key of the device and the public key of the remote device. The process of generating the second encryption key may also use ephemeral keys, such as the public ephemeral key of the remote device to bind the keys and ephemeral keys. In the context of the present example, the authenticator 116 generates an encryption key (k_e) based on the nonces, the private ephemeral key 212 of the initiator, the public key 226 of the responder, and the public ephemeral key 230 of the responder.

At 616, the first encrypted authentication tag is decrypted with the second encryption key. The first authentication tag may be decrypted to expose or provide a hash value useful to determine ownership of the public key received from the other device. Continuing the ongoing example, the authenticator 116 decrypts the first encrypted authentication tag to provide a hash value useful to determine if the responder 204 owns the previously decrypted public key 226.

At 618, verification information is generated based on the public ephemeral key of the device, the public ephemeral key of the remote device, and the public key of the remote device. In the context of the present example, the authenticator 116 generates a verification hash value based on the nonces, public ephemeral key 214 of the initiator, public ephemeral key 230 of the responder, and the public key 226 of the responder.

At 620, the remote device is authenticated by comparing the first authentication tag with the verification information. The verification information may include a complimentary authentication tag generated by the device. Continuing the ongoing example, the authenticator 116 compares the first authentication tag received from the responder 204 with the verification information generated based on the public key 226 of the responder. In response to the first authentication tag matching the verification information, the authenticator 116 validates the authentication tag and authenticates the responder 204.

At 622, a second authentication tag is generated based on the public ephemeral key of the remote device, the public ephemeral key of the device, and the public key of the remote device. The second authentication tag may be generated as a hash value of the public ephemeral keys of the devices and the public key of the remote device. In some cases, the hash value is generated using the public key of the device as well. In the context of the present example, the authenticator 116 generates a second authentication tag based on the public ephemeral key 230 of the responder, the public ephemeral key 214 of the initiator, and the public key 226 of the responder.

At 624, the second authentication tag is encrypted with the second encryption key to provide a second encrypted authentication tag. Alternately, the second authentication tag can be encrypted with the first encryption key. Continuing the ongoing example, the authenticator 116 encrypts the second authentication tag with the second encryption key generated based on the public key 226 of the responder 204 and the public key 210 of the initiator 202.

At 626, a hash of the public ephemeral key of the remote device and the second encrypted authentication tag are transmitted to the remote device to confirm authentication. In some cases, a hash of the public ephemeral key of the device is also transmitted with the second encrypted authentication tag. Concluding the present example, the authenticator 116 transmits an authentication confirmation 708 to the responder 204 to confirm authentication. In response to the authentication confirmation 708, the smart-phone may receive configuration information for accessing services of the printer 128.

Figure 8A:
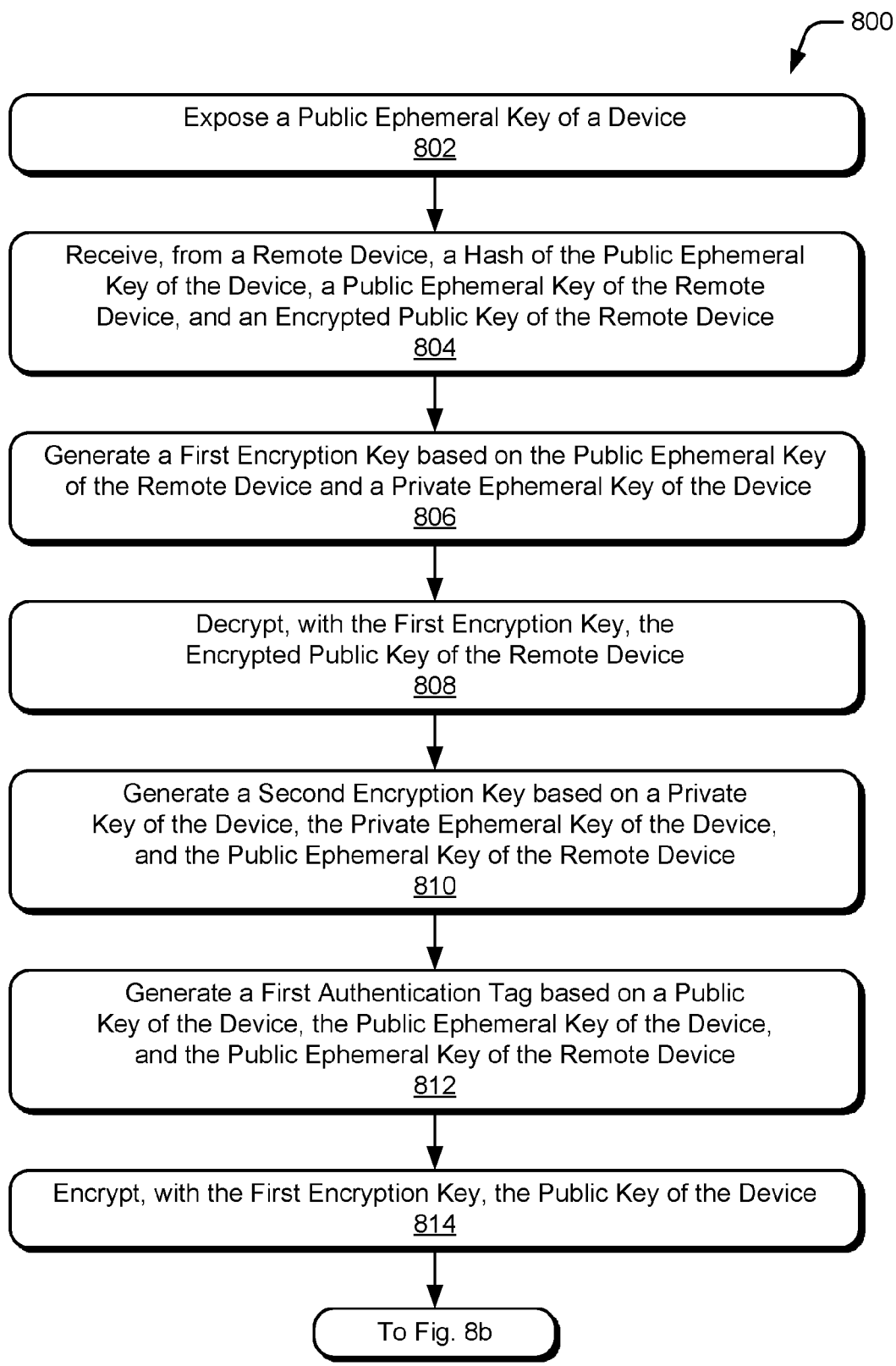
FIGS. 8a and 8b illustrate an example method for authenticating with a device based on an exchange of ephemeral keys.
Figure 8B:
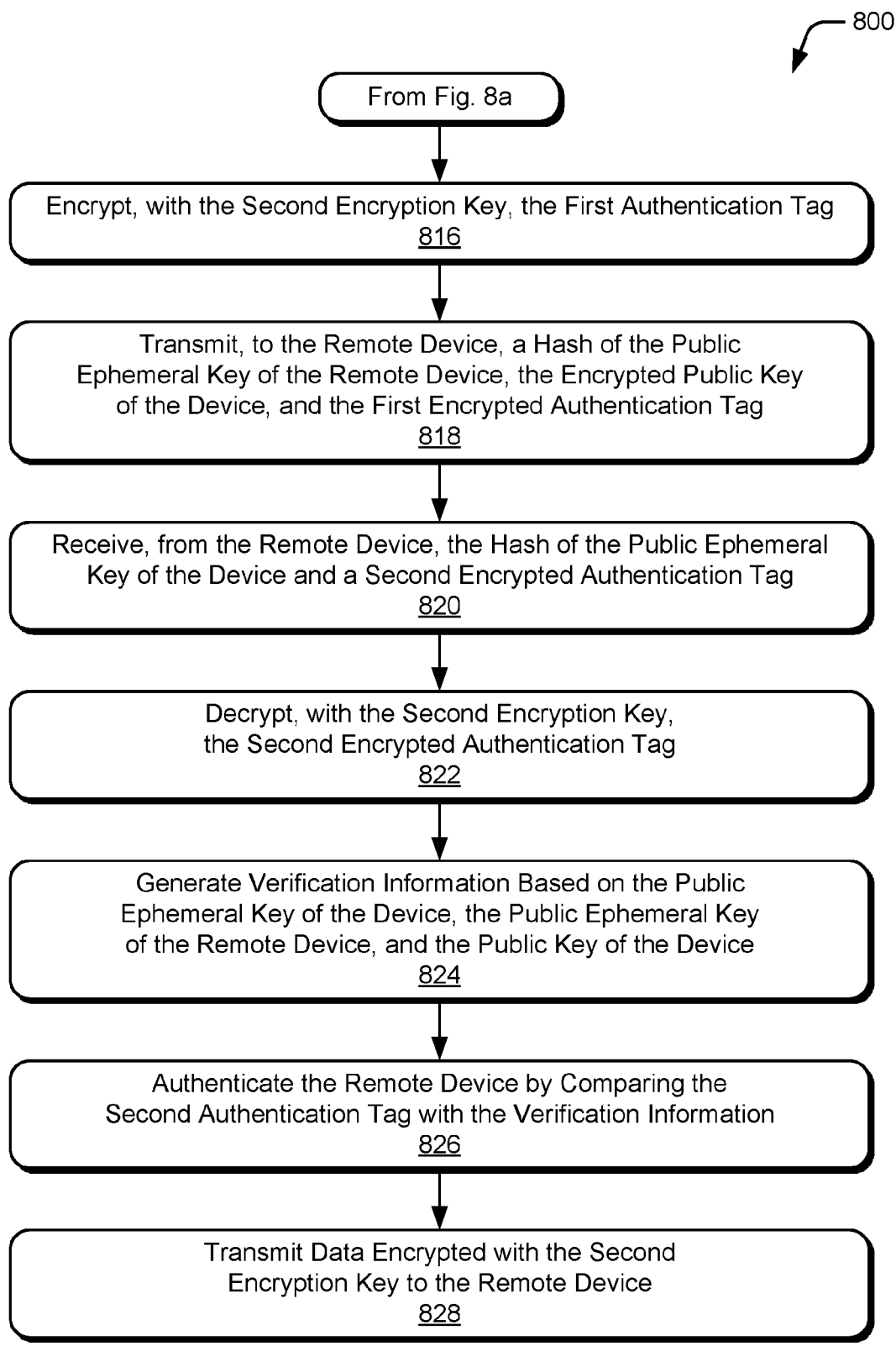

FIGS. 8*a* and 8*b* depict an example method 800 for authenticating with a device based on an ephemeral key exchange, including operations performed by the peer authenticator 142 and/or cryptography engine 236 of a responder 204. In some aspects, operations of method 800 may be implemented to provide a secure authentication protocol between devices to ensure wireless privacy during the authentication process.

At 802, a public ephemeral key of a device is exposed. In some cases, the public ephemeral key is exposed by broadcasting or transmitting the public ephemeral key through a wireless interface of the device. In other cases, the public ephemeral key is exposed via NFC, RFID, a WPAN, or a display of the device. Alternately or additionally, parameters of a key exchange, such as a cipher suite identifier can be exposed with the public ephemeral key of the device.

By way of example, consider again the smart-phone and printer 128 of FIG. 2 in which the devices are configured as an initiator 202 and responder 204, respectively. With reference to the previous example, the user of the smart-phone is attempting to access services of the printer 128. To do so, the user initiates a network connection application of the printer 128. The peer authenticator 142 of the printer 128 then exposes a public ephemeral key 230 by presenting, via a display of the printer, a QR code 702 that includes the public ephemeral key.

At 804, a hash of the public ephemeral key of the device, a public ephemeral key of a remote device, and an encrypted public key of the remote device is received from the remote device. In some cases, an encrypted nonce, encrypted indication of services, or encrypted indication of capabilities of the remote device is also received. Continuing the ongoing example, the peer authenticator 142 receives an authentication request 704 from the initiator 202 that includes a hash of the public ephemeral key 230 of the responder 204, a public ephemeral key 214 of the initiator 202, an encrypted public key 210 of the initiator and a nonce.

At 806, a first encryption key is generated based on the public ephemeral key of the remote device and a private ephemeral key of the device. The first encryption key may also include a self-declared key name or other information useful to identify the authentication session. In some cases, this encryption key is a shared encryption key that is useful encrypt authentication information exchanged between an initiator and responder. Continuing the ongoing example, the peer authenticator 142 uses an HKDF to provide a shared key 232 (e.g., an intermediate key) based on a private ephemeral key 228 of the responder 204 and the public ephemeral key 214 of the initiator 202.

At 808, the encrypted public key of the remote device is decrypted with the first encryption key. In some cases, other encrypted material received with the encrypted public key is decrypted with the first encryption key. In such cases, the other encrypted material may include nonces or an indication of services provided by the responder. Continuing the ongoing example, the peer authenticator 142 decrypts the encrypted public key 210 of the initiator, nonces, and an indication of services requested by the smart-phone.

At 810, a second encryption key is generated based on a private key of the device and the private ephemeral key of the device. The process of generating the second encryption key may also use ephemeral keys, such as the public ephemeral key of the remote device to bind the keys and ephemeral keys. In the context of the present example, the peer authenticator 142 generates an encryption key (k_e) based on the nonces, the secret key 224 of the responder, the private ephemeral key 228 of the responder, and the public ephemeral key 214 of the initiator.

At 812, a first authentication tag is generated based on a public key of the device, the public ephemeral key of the device, and the public ephemeral key of the remote device. The first authentication tag may be generated as a hash value of the public ephemeral keys of the devices and the public key of the device. In some cases, the hash value is generated using the public key of the remote device as well. In the context of the present example, the peer authenticator 142 generates a first authentication tag based on the public ephemeral key 214 of the initiator, the public ephemeral key 230 of the responder, and the public key 226 of the responder.

At 814, the public key of the device is encrypted with the first encryption key. A nonce, an indication of services, or an indication of capabilities of the device may also be encrypted with the first encryption key. In the context of the present example, the peer authenticator 142 encrypts the public key 226, nonces, and an indication of services provided by the responder 204 (printer 128).

At 816, the first authentication tag is encrypted with the second encryption key. Alternately, the first authentication tag can be encrypted with the first encryption key. Continuing the ongoing example, the peer authenticator 142 encrypts the first authentication tag with the second encryption key generated based on the secret key 224 of the responder 204.

At 818, a hash of the public ephemeral key of the remote device, the encrypted public key of the device, and the first encrypted authentication tag are transmitted to the remote device. The contents of the first authentication tag may be useful to prove ownership of the public key of the device. In the context of the present example, the peer authenticator 142 transmits an authentication response 706 to the initiator 202 that includes a hash of the public ephemeral key 214 of the initiator, the encrypted public key 226 of the responder, encrypted nonces, and the first encrypted authentication tag.

At 820, a hash of the public ephemeral key of the device and a second encrypted authentication tag are received from the remote device. The contents of the second authentication tag may be effective to confirm authentication with the remote device. In some cases, a hash of the public ephemeral key of the remote device is also received. Alternately or additionally, the second authentication tag may be encrypted with the second authentication key. Continuing the ongoing example, the peer authenticator receives an authentication confirmation 708 from the initiator 202 that includes a hash of the public ephemeral key 230 of the responder and a second encrypted authentication tag.

At 822, the second encrypted authentication tag is decrypted with the second encryption key. Alternately, the second authentication tag can be decrypted with the first encryption key. Continuing the ongoing example, the peer authenticator 142 decrypts the second authentication tag with the encryption key generated based on the secret key 224 of the responder and the private ephemeral key 228 of the responder.

At 824, verification information is generated based on the public ephemeral key of the device, the public ephemeral key of the remote device, and the public key of the device. In the context of the present example, the peer authenticator 142 generates a verification hash value based on the nonces, public ephemeral key 230 of the responder, public ephemeral key 214 of the initiator, and the public key 226 of the responder.

At 826, the remote device is authenticated by comparing the second authentication tag to the verification information. The verification information may include a complimentary authentication tag generated by the device. Continuing the ongoing example, the peer authenticator 142 compares the second authentication tag received from the initiator 202 with the verification information generated based on the public key 226 of the responder. In response to the second authentication tag matching the verification information, the peer authenticator 142 validates the second authentication tag and authenticates the initiator 202.

At 828, data encrypted with the second encryption key is transmitted to the remote device. A hash of the public ephemeral key of the remote device may also be transmitted with the encrypted data. In some cases, the data is encrypted with the second encryption key or key generated through the exchange of ephemeral or random device keys. Concluding the present example, the authenticator transmits printer configuration information 710 to the initiator 202 that includes a hash of the public ephemeral key 214 of the initiator and encrypted data that is useful to enable print services of the smart-phone.

System-On-Chip

Figure 9:
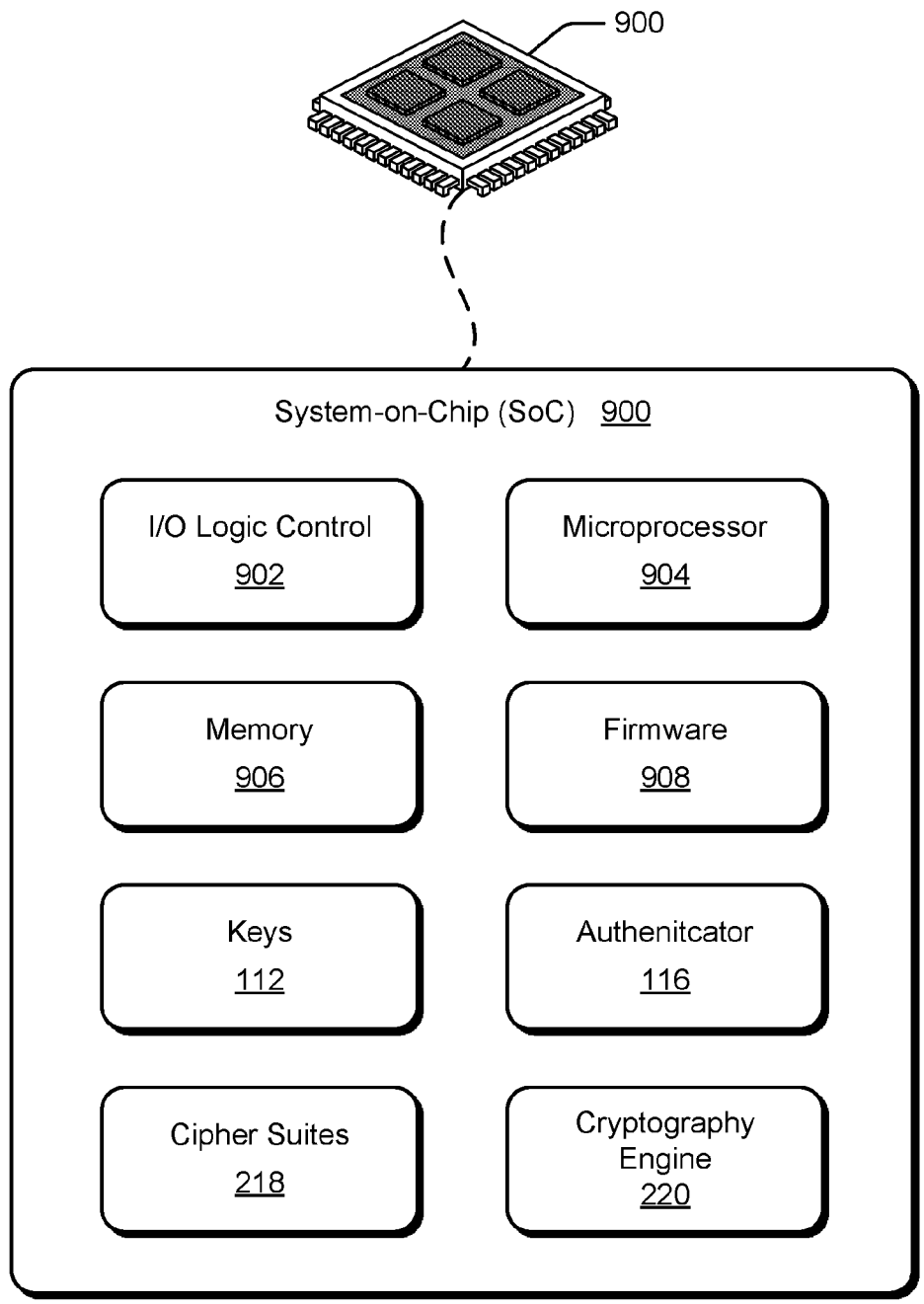
FIG. 9 illustrates an example System-on-Chip (SoC) environment for implementing aspects of secure device authentication.

FIG. 9 illustrates an exemplary System-on-Chip (SoC) 900 that can implement various aspects of secure device authentication. The SoC 900 can be implemented in any suitable device, such as a smart-phone, cellular phone, netbook, tablet computer, server, wireless router, network-attached storage, camera, smart appliance, printer, a set-top box, or any other suitable type of device. Although described with reference to a SoC, the entities of FIG. 9 may also be implemented as a network interface controller (NIC), application-specific standard part (ASSP), digital signal processor (DSP), programmable SoC (PSoC), or field-programmable gate array (FPGA).

The SoC 900 can be integrated with electronic circuitry, a microprocessor, memory, input-output (I/O) logic control, communication interfaces, other hardware, firmware, and/or software useful to provide functionalities of a device, such as any of the devices listed herein. The SoC 900 may also include an integrated data bus (not shown) that couples the various components of the SoC for data communication between the components. The integrated data bus or other components of the SoC 900 may be exposed or accessed through an external port. For example, components the SoC 900 may be tested, configured, or programmed (e.g., flashed) through the external port at different stages of manufacture.

In this example, the SoC 900 includes various components such as input-output (I/O) logic control 902 (e.g., to include electronic circuitry) and a microprocessor 904 (e.g., any of a microcontroller, processor core, application processor, or DSP). The SoC 900 also includes memory 906, which can be any type and/or combination of RAM, SRAM, DRAM, low-latency nonvolatile memory, ROM, one-time programmable (OTP) memory, and/or other suitable electronic data storage. Alternately or additionally, the SoC 900 may comprise a data interface (not shown) for accessing additional or expandable off-chip memory, such as external SRAM or flash memory. In some cases, the SoC 900 includes various applications, operating systems, and/or software, such as firmware 908, which can be computer-executable instructions maintained by memory 906 and executed by microprocessor 904. The SoC 900 may also include other various memory interfaces and components embodied as hardware, firmware, software, or any suitable combination thereof In some aspects, the SoC 900 also includes keys 112, an authenticator 116, cipher suites 218, and a cryptography engine 220, which may be embodied as disparate or combined components, as described in relation to aspects presented herein. Examples of these components and/or entities, and their corresponding functionality, are described with reference to the respective components of the environment 100 shown in FIGS. 1 and 2. The authenticator 116, either in whole or part, can be implemented as processor-executable instructions (e.g., firmware 908) maintained by the memory 906 and executed by the microprocessor 904 to implement various aspects and/or features of secure device authentication as described herein.

The authenticator 116, either independently or in combination with other entities, can be implemented with any suitable combination of components or circuitry to implement various aspects and/or features described herein. The authenticator 116 may also be provided integral with other entities of the SoC 900, such as integrated with the I/O logic 902, a network interface controller, or the cryptography engine 220 within the SoC 900. Alternately or additionally, the authenticator 116 and the other components can be implemented as hardware, firmware, fixed logic circuitry, or any combination thereof Further aspects of the present disclosure relate to one or more of the following clauses.

A method includes exposing a public ephemeral key of a device. A message received from a remote device includes a hash of the public ephemeral key of the device, a public ephemeral key and encrypted public key of the remote device, and an encrypted hash value useful to prove ownership of the public key of the remote device. An encryption key is generated based on the public ephemeral key of the remote device and a private ephemeral key of the device. The device then decrypts, with the encryption key, the encrypted public key of the remote device and the encrypted hash value. The remote device is then authenticated by verifying, based on the decrypted hash value, that the remote device owns the decrypted public key.

In the method, the message is a first message, the hash value is a first hash value, and the method further includes encrypting, with the encryption key, a public key of the device and a second hash value useful to prove ownership of the public key of the device. The method also includes transmitting, via the hardware-based communication interface of the device and to the remote device, a second message that includes a hash of the public ephemeral key of the remote device, the encrypted public key of the device, and the second encrypted hash value to confirm authentication with the remote device.

In the method, the first message also comprises credentials of the remote device, wireless networking information of the remote device, an indication of capabilities of the remote device, or an indication of services provided by the remote device. In the method, the second message also comprises credentials of the device, wireless networking information of the device, an indication of capabilities of the device, or an indication of services provided by the device.

In the method, exposing the public ephemeral key of the device includes transmitting, via the hardware-based communication interface, the public ephemeral key of the device to the remote device. Alternately in the method, the public ephemeral key of the device is exposed via near-field communication, radio frequency identification, a low-power wireless personal area network, or a display of the device.

In the method, the hash value includes a hash of a private key of the remote device, a private ephemeral key of the remote device, and the public ephemeral key of the device.

In the method, the hash value is a first hash value and the act verifying includes generating a second hash value based on a private key of the device, the public key of the remote device, and the public ephemeral key of the remote device. The method compares the first hash value and the second hash value and authenticates the remote device responsive to the first hash value matching the second hash value.

In the method, the first message also includes a cipher suite identifier and the method determines, based on the cipher suite identifier and public ephemeral key of the remote device, a unique identifier associated with the remote device.

Another method receives, at a device, a public ephemeral key of the remote device. An encryption key is generated based on the public ephemeral key of the remote device and a private ephemeral key of the device. The method also generates, based on a private key of the device, a hash value useful to prove ownership of the public key. The public key of the device and the first hash value are then encrypted with the encryption key. A first message is transmitted to the remote device that includes a hash of the public ephemeral key of the remote device, a public ephemeral key of the device, the encrypted public key of the device, and the first encrypted hash value. A second message received from the remote device includes a hash of the public ephemeral key of the device, an encrypted public key of the remote device, and a second encrypted hash value. The encrypted public key and the second encrypted hash value are decrypted with the encryption key. The method then verifies, based on the second hash value, that the remote device owns the public key to authenticate the remote device.

The method further includes transmitting, via the hardware-based communication interface and to the remote device, a third message that includes a hash of the public ephemeral key of the remote device and encrypted information effective to indicate the authentication of the remote device.

In the method, the public ephemeral key of the remote device is received via the hardware-based communication interface. Alternately, in the method the public ephemeral key of the remote device is received via near-field communication, radio frequency identification, a low-power wireless personal area network, an optical sensor, or user-input interface.

The method further includes generating the first hash value based on a private key of the device, the public ephemeral key of the remote device, and a private ephemeral key of the device.

In the method the act verifying comprises generating a third hash value based on a private ephemeral key of the device, the public key of the remote device, and the public ephemeral key of the remote device. The act of verifying also includes comparing the second hash value to the third hash value and authenticating the remote device responsive to the second hash value matching the third hash value.

In the method the first message also includes credentials of the device, wireless networking information of the device, an indication of capabilities of the device, or an indication of services of the device. In the method the second message also includes credentials of the remote device, wireless networking information of the remote device, an indication of capabilities of the remote device, or an indication of services of the remote device.

A secure authentication device comprises a communication interface, a hardware-based processor, and a memory storing processor-executable instructions that, responsive to execution by the processor, implement an authenticator. The authenticator exposes a public ephemeral key of a device. A message received from a remote device includes a hash of the public ephemeral key of the device, a public ephemeral key and encrypted public key of the remote device, and an encrypted hash value useful to prove ownership of the public key of the remote device. The authenticator then generates an encryption key based on the public ephemeral key of the remote device and a private ephemeral key of the device. With the encryption key, the authenticator decrypts the encrypted public key of the remote device and the encrypted hash value. The remote device is authenticated by verifying, based on the decrypted hash value, that the remote device owns the decrypted public key received from the remote device.

In the device, the message is a first message, the hash value is a first hash value, and the authenticator is further implemented to encrypt, with the encryption key, a public key of the device and a second hash value useful to prove ownership of the public key of the device. The authenticator of the device is also implemented to transmit, via the hardware-based communication interface and to the remote device, a second message that includes a hash of the public ephemeral key of the remote device, the encrypted public key of the device, and the second encrypted hash value to confirm authentication with the remote device.

In the device, the first message also includes credentials of the remote device, wireless networking information of the remote device, an indication of capabilities of the remote device, or an indication of services provided by the remote device. In the device, the second message also includes credentials of the device, wireless networking information of the device, an indication of capabilities of the device, or an indication of services provided by the device.

In the device, the public ephemeral key of the device is exposed by the authenticator transmitting, via the hardware-based communication interface and to the remote device, the public ephemeral key.

In the device, the device is embodied as one of a computing device, system-on-chip (SoC), or network interface controller (NIC), and the hardware-based communication interface is configured as an IEEE 802.11 compliant network interface.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method for securely authenticating a remote device, the method comprising:
   exposing a public ephemeral key of a device;
   receiving, via a hardware-based communication interface of the device and from the remote device, a message that includes (i) a hash of the public ephemeral key of the device, (ii) a public ephemeral key of the remote device, (iii) an encrypted public key of the remote device, and (iv) an encrypted hash value useful to prove ownership of the encrypted public key of the remote device;
   generating an encryption key based on (i) the public ephemeral key of the remote device and (ii) a private ephemeral key of the device;
   decrypting, with the encryption key, (i) the encrypted public key of the remote device and (ii) the encrypted hash value; and
   authenticating the remote device by verifying, based on the decrypted hash value, that the remote device owns the decrypted public key received from the remote device.

2. The method as recited in claim 1, wherein the message is a first message, the decrypted hash value is a first decrypted hash value, and the method further comprises:
   encrypting, with the encryption key, a public key of the device and a second hash value useful to prove ownership of the public key of the device; and
   transmitting, via the hardware-based communication interface of the device and to the remote device, a second message that includes a hash of the public ephemeral key of the remote device, the encrypted public key of the device, and the second encrypted hash value to confirm authentication with the remote device.

3. The method as recited in claim 2, wherein:
   the first message further comprises credentials of the remote device, wireless networking information of the remote device, an indication of capabilities of the remote device, or an indication of services provided by the remote device; or
   the second message further comprises credentials of the device, wireless networking information of the device, an indication of capabilities of the device, or an indication of services provided by the device.

4. The method as recited in claim 1, wherein exposing the public ephemeral key of the device includes transmitting, via the hardware-based communication interface, the public ephemeral key of the device to the remote device.

5. The method as recited in claim 1, wherein the public ephemeral key of the device is exposed via near-field communication, radio frequency identification, a low-power wireless personal area network, or a display of the device.

6. The method as recited in claim 1, wherein the hash value includes a hash of a private key of the remote device, a private ephemeral key of the remote device, and the public ephemeral key of the device.

7. The method as recited in claim 6, wherein the hash value is a first hash value and the act verifying comprises:
   generating a second hash value based on a private key of the device, the public key of the remote device, and the public ephemeral key of the remote device;
   comparing the first hash value and the second hash value; and
   authenticating the remote device responsive to the first hash value matching the second hash value.

8. The method as recited in claim 1, wherein the message further comprises a cipher suite identifier and the method further comprises determining, based on the cipher suite identifier and public ephemeral key of the remote device, a unique identifier associated with the remote device.

9. A method for securely authenticating a remote device, the method comprising:
   receiving, at a device, a first public ephemeral key from the remote device;
   generating, based on the first public ephemeral key and a private ephemeral key of the device, an encryption key;
   encrypting, with the encryption key, a first public key of the device and a first hash value useful to prove ownership of the first public key;
   transmitting, via a hardware-based communication interface of the device and to the remote device, a first message that includes (i) a hash of the first public ephemeral key received from the remote device, (ii) a second public ephemeral key of the device, (iii) the encrypted first public key of the device, and (iv) the encrypted first hash value;
   receiving, via the hardware-based communication interface of the device and from the remote device, a second message that includes (i) a hash of the second public ephemeral key of the device, (ii) an encrypted second public key of the remote device, and (iii) an encrypted second hash value;
   decrypting, with the encryption key, (i) the encrypted second public key of the remote device and (ii) the encrypted second hash value; and
   authenticating the remote device by verifying, based on the decrypted second hash value, that the remote device owns the decrypted second public key.

10. The method as recited in claim 9, further comprising transmitting, via the hardware-based communication interface and to the remote device, a third message that includes a hash of the second public ephemeral key and encrypted information effective to indicate the authentication of the remote device.

11. The method as recited in claim 9, wherein the first public ephemeral key received from the remote device is received via the hardware-based communication interface.

12. The method as recited in claim 9, wherein the first public ephemeral key received from the remote device is received via near-field communication, radio frequency identification, a low-power wireless personal area network, an optical sensor, or user-input interface.

13. The method as recited in claim 9, further comprising generating the first hash value based on a private key of the device, the first public ephemeral key received from the remote device, and a private ephemeral key of the device.

14. The method as recited in claim 9, wherein the act verifying comprises:
  generating a third hash value based on a private ephemeral key of the device, the decrypted second public key of the remote device, and the first public ephemeral key received from the remote device;
  comparing the decrypted second hash value to the third hash value; and
  authenticating the remote device responsive to the decrypted second hash value matching the third hash value.

15. The method as recited in claim 9, wherein:
  the first message further comprises credentials of the device, wireless networking information of the device, an indication of capabilities of the device, or an indication of services of the device; or
  the second message further comprises credentials of the remote device, wireless networking information of the remote device, an indication of capabilities of the remote device, or an indication of services of the remote device.

16. A device for secure authentication device, the device comprising:
  a hardware-based communication interface for wireless communication;
  a hardware-based processor; and
  a memory storing processor-executable instructions that, responsive to execution by the processor, implement an authenticator to:
    expose a public ephemeral key of the device;
    receive, via the hardware-based communication interface and from the remote device, a message that includes (i) a hash of the public ephemeral key of the device, (ii) a public ephemeral key of the remote device, (iii) an encrypted public key of the remote device, and (iv) an encrypted hash value useful to prove ownership of the public key received from the remote device;
    generate an encryption key based on (i) the public ephemeral key of the remote device and (ii) a private ephemeral key of the device;
    decrypt, with the encryption key, (i) the encrypted public key of the remote device and (ii) the encrypted hash value; and
    authenticate the remote device by verifying, based on the decrypted hash value, that the remote device owns the decrypted public key.

17. The device as recited in claim 16, wherein the message is a first message, the encrypted hash value is a first hash value, and the authenticator is further implemented to:
  encrypt, with the encryption key, a public key of the device and a second hash value useful to prove ownership of the public key of the device; and
  transmit, via the hardware-based communication interface and to the remote device, a second message that includes a hash of the public ephemeral key of the remote device, the encrypted public key of the device, and the second encrypted hash value to confirm authentication with the remote device.

18. The device as recited in claim 17, wherein:
  the first message further comprises credentials of the remote device, wireless networking information of the remote device, an indication of capabilities of the remote, or an indication of services provided by the remote device; or
  the second message further comprises credentials of the device, wireless networking information of the device, an indication of capabilities of the device, or an indication of services provided by the device.

19. The device as recited in claim 17, wherein the device is embodied as one of a computing device, system-on-chip (SoC), or network interface controller (NIC), and the hardware-based communication interface is configured as an IEEE 802.11 compliant network interface.

20. The device as recited in claim 16, wherein to expose the public ephemeral key of the device, the authenticator transmits, via the hardware-based communication interface and to the remote device, the public ephemeral key.

* * * * *